(12) United States Patent
Muranaka

(10) Patent No.: US 7,702,704 B2
(45) Date of Patent: Apr. 20, 2010

(54) RANDOM NUMBER GENERATING METHOD AND SEMICONDUCTOR INTEGRATED CIRCUIT DEVICE

(75) Inventor: Masaya Muranaka, Akishima (JP)

(73) Assignee: Hitachi ULSI Systems Co., Ltd., Tokyo (JP)

( * ) Notice: Subject to any disclaimer, the term of this patent is extended or adjusted under 35 U.S.C. 154(b) by 778 days.

(21) Appl. No.: 10/588,788

(22) PCT Filed: Feb. 12, 2004

(86) PCT No.: PCT/JP2004/001486

§ 371 (c)(1),
(2), (4) Date: Aug. 9, 2006

(87) PCT Pub. No.: WO2005/078573

PCT Pub. Date: Aug. 25, 2005

(65) Prior Publication Data

US 2007/0143384 A1    Jun. 21, 2007

(51) Int. Cl.
*G06F 1/02* (2006.01)
(52) U.S. Cl. ........................... 708/250; 708/255
(58) Field of Classification Search ............... 708/250, 708/251, 255
See application file for complete search history.

(56) References Cited

U.S. PATENT DOCUMENTS

| | | | | |
|---|---|---|---|---|
| 5,961,577 | A * | 10/1999 | Soenen et al. | 708/251 |
| 5,963,104 | A |  10/1999 | Buer | |
| 6,188,294 | B1 * | 2/2001 | Ryan et al. | 331/78 |
| 6,459,722 | B2 * | 10/2002 | Sriram et al. | 375/130 |
| 6,941,536 | B2 | 9/2005 | Muranaka | |
| 7,282,377 | B2 | 10/2007 | Muranaka | |
| 7,356,552 | B2 * | 4/2008 | Hars | 708/250 |
| 2002/0083105 | A1 | 6/2002 | Hourdequin et al. | |
| 2003/0061250 | A1 | 3/2003 | Fujita et al. | |
| 2004/0006580 | A1 | 1/2004 | Miller, Jr. | |
| 2004/0053429 | A1 | 3/2004 | Muranaka | |
| 2008/0028349 | A1 | 1/2008 | Muranaka | |

FOREIGN PATENT DOCUMENTS

| | | |
|---|---|---|
| EP | 0 308 294 A2 | 9/1988 |
| JP | 1-114211 A | 5/1989 |

(Continued)

OTHER PUBLICATIONS

Fujita et al., "Ultrasmall Random Number Generators for High-Level Information Security," Toshiba Review, vol. 58, No. 8, pp. 47-51 (2003).

*Primary Examiner*—Chuong D Ngo
(74) *Attorney, Agent, or Firm*—Miles & Stockbridge P.C.

(57) ABSTRACT

A random number generating method for an electronic device including a plurality of unit circuits each first and second logic circuits, each logic circuit having a same shape and being formed through a same fabrication process, and an amplifier circuit for forming a binary signal by amplifying a noise superposed on the differential voltage of threshold voltages of the first and the second logic circuits; and a signal variation detecting circuit for forming an output signal in response to a variation in any of a plurality of binary signals outputted from the plurality of unit circuits, wherein a plurality of binary signals outputted from the signal variation detecting circuit are combined to generate a random number.

18 Claims, 22 Drawing Sheets

FOREIGN PATENT DOCUMENTS

| | | |
|---|---|---|
| JP | 2000-66585 A | 3/2000 |
| JP | 2003-108363 A | 4/2003 |
| JP | 2003-173254 A | 6/2003 |
| JP | 2003-332452 A | 11/2003 |
| WO | WO 01/67231 A2 | 9/2001 |
| WO | WO 02/45139 A1 | 6/2002 |
| WO | WO 03/081417 A2 | 10/2003 |

* cited by examiner

R = D0 * D1 * ··· * Dn (a)

VLT1 = VLT2

(b)

VLT1 + Vnz < VLT2

(c)

(a)

(b)

RANDOM NUMBER GENERATING CIRCUIT

LSI
RANDOM NUMBER GENERATING CIRCUIT

LSI
RANDOM NUMBER GENERATING CIRCUIT (a)

(b)

RANDOM NUMBER GENERATING METHOD AND SEMICONDUCTOR INTEGRATED CIRCUIT DEVICE

TECHNICAL FIELD

The present invention relates to a random number generating method and a semiconductor integrated circuit device and in particular, to a random number generating method appropriate for a semiconductor fabrication technique and a technique which can be effectively used in the semiconductor integrated circuit device.

BACKGROUND ART

Recently, networks and IT technique are rapidly spread all over the world, which requires security technique such as the encryption technique and the authentication technique. As one element of these techniques, random numbers are often used. Currently, random number generating circuits based on several types of basic principles have come into practical use. "Toshiba Review" Vol. 58.8 (2003) (first prior art) is an example of ultra-small-size true random number generating circuit for sophisticated information security. Moreover, JP-A-2003-173254 (second prior art) discloses a random number generating circuit using an ambiguous output obtained by turning power supply of an RS flip-flop ON/OFF.

DISCLOSURE OF THE INVENTION

The performance of a random number generating circuit may be compared in the quality (irregularity) of the random number, a circuit area, power consumption, response time (time required for generating a new random number, and the like. However, the conventional random number generating circuits have good and bad points. There are two types of random numbers: a pseudo random number generated by a computer algorithm and a true random number generated by using a physical phenomenon in the nature. In general, it is considered that the latter has a higher quality. True random number has advantages of eventuality, un-reproducibility, and unpredictability but it requires a complicated circuit and element which cannot be obtained in a simple device. For example, the technique suggested in the first prior art relates to a true random number generating circuit which requires modification or a process (etching process) and its control. Moreover, the second prior art uses a phenomenon occurring in the transient state when power is turned ON. Accordingly, a factor lowering the irregularity of a random number cannot be predicted at the design stage and it is difficult to guarantee the quality of the random number.

It is therefore an object of the present invention to provide a random number generating method capable of generating a high-quality random number with a small area without requiring modification of the fabrication process and a semiconductor integrated circuit device using a random number generating circuit. Another object of the present invention is to provide a random number generating method realizing lower power consumption and a semiconductor integrated circuit device having such a random number circuit. These and other objects of the present invention will become clear from the description of this specification and the attached drawings.

Among the inventions disclosed in the present application, the representative one can be outlined as follows. That is, the representative invention includes: a plurality of unit circuits each having a first and a second logic circuit formed into an identical shape through an identical fabrication process and an amplifier circuit for forming a binary signal by amplifying a noise superposed on the differential voltage of threshold voltages of the first and the second logic circuits; and a signal variation detecting circuit for forming an output signal in response to variation in any of a plurality of binary signals outputted from the plurality of unit circuits, wherein a plurality of binary signals outputted from the signal variation detecting circuit are combined to generate a random number.

BEST MODE FOR CARRYING OUT THE INVENTION

The invention will be described in detail with reference to the attached drawings.

Figure 1:
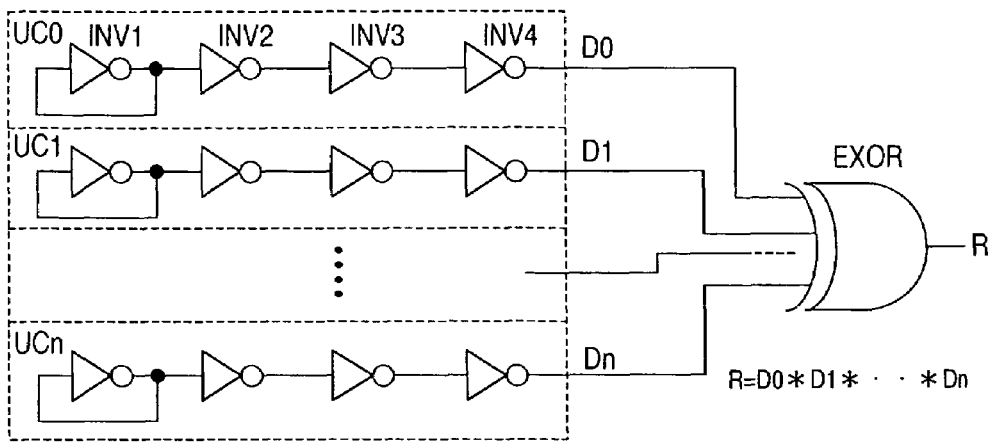
FIG. 1 shows a circuit diagram showing a basic concept of a true random number generating circuit mounted on a semiconductor integrated circuit according to the present invention.

FIG. 1 shows a circuit diagram of the basic concept of a true random number generating circuit mounted on a semiconductor integrated circuit device according to the present invention. CMOS inverter circuits INV1 to INV4 shown in FIG. 1 are configured so as to have identical characteristic within an actually controllable range according to the design and fabrication of the semiconductor integrated circuit device. The technique for making that a plurality of inverters have identical characteristic will be briefly explained below.

In a CMOS inverter circuit, it is considered that its characteristic is substantially decided by relative conductance between a P-channel type MOSFET and an N-channel type MOSFET constituting the circuit. In this viewpoint, CMOS inverters of the identical characteristic can be configured by MOSFET having an identical ratio W/L wherein W is the channel width W and L is the channel length but different sizes. However, the affect of fabrication irregularities of the semiconductor integrated circuit device to the electric characteristic is different for the element of different sizes.

In this embodiment, a plurality of CMOS inverters INV1 to INV4 are preferably configured in such a way that P-channel type MOSFETs have identical structure and identical size while N-channel type MOSFETs have identical structure and identical size. These elements are fabricated according to the characteristic of the semiconductor integrated circuit device that identical elements are fabricated all at once by the identical fabrication process. Thus, the plurality of CMOS inverters INV1 to INV4 have uniform fabrication irregularities of the semiconductor integrated circuit device such as treatment dimension irregularities, various layer thickness irregularities, and impurities concentration irregularities.

As in FIG. 1, output voltage of the CMOS inverter circuit INV1 whose input and output are short-circuited reaches a logical threshold value voltage. If all the CMOS inverter circuits have completely identical electric characteristics, the four invert circuits INV1 to INV4 have an identical logical threshold value voltage. However, this is an ideal state. In the actual semiconductor elements, a slight characteristic difference exists and there is a difference between the logical threshold value voltages of the respective inverter circuits INV1 to INV4.

The significant cause of the irregularities of the logical threshold value of the CMOS inverter circuits can be considered to be the irregularities of MOS transistor characteristics. Furthermore, the irregularities of the MOS transistor characteristics care caused by the gate width, the gate insulation film thickness, conductivity decision impurities concentration and its distribution, and the like. These irregularities may be divided into a macro portion and a micro portion. The macro portion may be the gate width irregularities between a plurality of wafers in the same lot.

The present invention mainly consider the micro portion of the irregularities, i.e., irregularities between elements arranged at a comparatively near distance. Such micro irregularities are observed to be generated at random between the elements at a comparatively near distance.

That is, it is considered that the irregularities of the logical threshold values of the inverter circuits INV1 and INV2 in FIG. 1 are also random. The irregularities of the logical threshold values are not preferable for generating a true random number as will be detailed later. However, from another point of view, characteristic irregularities unique to the respective semiconductor elements can be used as identifiers. That is, when a CMOS inverter circuit is used, the irregularities generated in the logical threshold values can be considered as the irregularities of the N-channel type MOS transistor added by the irregularities of the P-channel type MOS transistor. The range of irregularities is made greater and it is possible to effectively generate an identification number or identifier. However, this is not preferable for generating a true random number in response to a noise generated in each node of the semiconductor element.

In the conceptual diagram shown in FIG. 1, the four inverter circuits INV1 to INV4 serve as a basic circuit (or a unit circuit) UC0 and the input and output of the CMOS inverter circuit INV1 are short-circuited to form the logical threshold value voltage VLT1 of the inverter circuit INV1. The logical threshold value voltage VLT1 is supplied to the input of the invert circuit INV2. In the inverter circuit INV2, its threshold value voltage VLT2 is used as a reference voltage to compare it with the logical threshold value voltage VLT1 and to perform amplification operation. The output signal of the inverter circuit INV2 is further amplified by an amplifier circuit formed by the inverter circuits INV3 and INV4 longitudinally connected and is converted into a binary signal.

Under an ideal condition, design and fabrication are performed so that the voltage of the short-circuited I/O nodes of the first inverter circuit INV1 of the basic circuit is equal to the logical threshold value voltage VLT2 of the second inverter circuit INV2. However, process irregularities as follows exist actually and coincidence may not be obtained.

When an electron moves in a semiconductor, it moves irregularly, which causes a slight electric signal noise. This phenomenon is generated in both of the first inverter circuit INV1 and the second inverter circuit INV2. However, under the ideal condition such as VLT1=VLT2, the electric signal noise of the first inverter circuit INV 1 is amplified by the second inverter circuit INV2. The output signal of the second inverter circuit reflects the electric signal noise and vibrates. Since the electric signal noise behaves completely irregularly, the output signal obtained from the second inverter circuit INV2 can be said to be a true random number.

Figure 2:
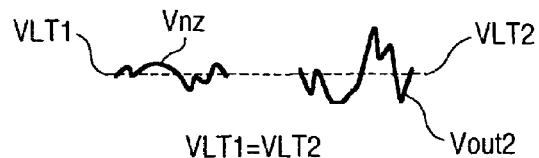
FIG. 2 shows an operation principle explaining the true random number generating circuit in FIG. 1.
Figure 2:
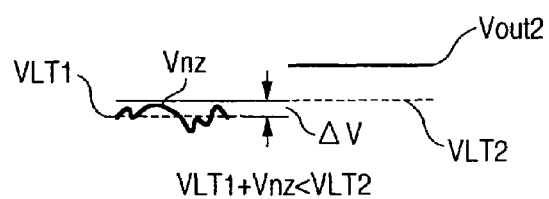
Figure 2:
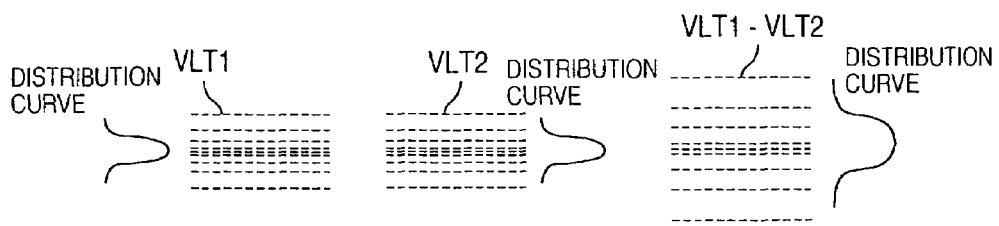

That is, as shown in FIG. 2(a), in the unit circuit UC0, when the logical threshold value voltage VLT1 of the first inverter circuit INV1 coincides with the logical threshold value VLT2 of the second inverter circuit INV2, the electric signal noise Vnz is reversed/amplified and can be taken out as an output signal Vout. It should be noted that in FIG. 2(a) the electric signal noise of the second inverter circuit INV2 is omitted and contained in the electric signal noise Vnz of the first inverter circuit INV1. Thus, the electric signal noise Vnz of the first inverter circuit INV1 is reversed/amplified by the second inverter circuit INV2. Furthermore, the output signal Vout of the second inverter circuit INV2 is further amplified by the third and the fourth inverter circuits INV3, INV4. At the output of the fourth inverter circuit INV4, it is possible to lastly take out information on the logical level of the amplitude of the power source voltage level.

However, the electric signal noise Vnz is quite small and actually, MOS transistors constituting the respective inverter circuits INV1, INV2 have irregular characteristics because of the reasons explained above. Accordingly, the logical threshold value voltages VLT1 and VLT 2 of the first and the second inverter circuits INV1 and INV2 of the basic circuit UC0 are not always identical.

That is, as shown in FIG. 2(b), a differential voltage ΔV caused by process irregularities such as ΔV exists between the logical threshold value voltages VLT1 and VLT2 of the first inverter circuit INV1 and the second inverter circuit INV2 of the unit circuit UC0. When the logical threshold value voltage VLT2 of the second inverter circuit INV2 is always greater than the amplitude of the electric signal voltage noise Vnz, the output signal Vout of the second inverter circuit INV2 is always at high level. Accordingly, when the unit circuit UC0 is viewed solely, it is not always guaranteed that the output signal Vout of the second inverter circuit INV2 reflects the electric signal noise Vnz.

For this, generally, trimming is performed and a compensation circuit is added to correct the aforementioned process irregularities of the two logical threshold value voltages VLT1 and VLT2. This causes problems such as complication of the circuit and increase of the current consumption.

The inventor of the present invention paid attention on that the irregularities of the transistor characteristics exhibit a random normal distribution. As shown in FIG. 1, when a plenty of basic circuits are observed, there is a certain probability that there is such a combination that the characteristics of the first inverter circuit INV1 and the second inverter circuit INV2 are quite similar. The inventor found that such a basic circuit sensitively reacts to the electric noise Vnz shown in FIG. 2(a).

That is, as shown in the threshold value voltage distribution diagram in FIG. 2(c), it is known that the logical threshold value voltages VLT1 and VLT2 of the inverter circuits INV1 and INV2 are expressed as a normal distribution. When the two inverter circuits INV1 and INV2 are combined, their difference VLT1−VLT 2 forms a normal distribution in which variance of the original logical threshold value voltages VLT1 and VLT2 is doubled. The probability that there exists a basic circuit in which the difference VLT1−VLT 2 of the logical threshold value voltages of the first inverter circuit and the second inverter circuit is smaller than the amplitude of the electric signal noise voltage Vnz is decided by the variance of the logical threshold value voltage VLT of the inverter circuit and the amplitude Vnz of the electric signal noise voltage. The average number of basic circuits reflecting the electric signal noise contained in the basic circuit group is the number of basic circuits constituting the basic circuit group multiplied by the aforementioned probability.

In FIG. 1, when output D0 to Dn of a plurality of basic circuits such as UC0 to UCn are inputted to a signal variation detecting circuit EXOR such as an exclusive OR circuit, the output R reacts to a change of any of the output signals D0 to Dn of the connected basic circuits UC0 to UCn and is reversed.

Each output of the basic circuit group having the plurality of basic circuits UC0 to UCn including at least one basic circuit of a combination of the first inverter circuit and the second inverter circuit whose characteristics are quite similar is inputted to the signal variation detecting circuit EXOR. Then, the output R of the signal variation detecting circuit EXOR such as an exclusive OR circuit is revered if one of the outputs D0 to Dn of the basic circuits UC0 to UC1 changes. That is, when the input of the signal variation detecting circuit EXOR is an output of the basic circuit, the output is a true random number reflecting the electric noise of the basic circuit. Even when the basic circuit group includes a plurality of basic circuits of a combination of the first inverter circuit and the second inverter circuit whose characteristics are quite similar, there is no correlation between electric signal noises of the respective basic circuit and accordingly, the output R of the signal variation detecting circuit EXOR is similarly a random number. It is possible to obtain a true random number of a higher quality. In the logical expression R=D0*D1* . . . *Dn shown in FIG. 1, the symbol * is an exclusive OR symbol.

Figure 3:
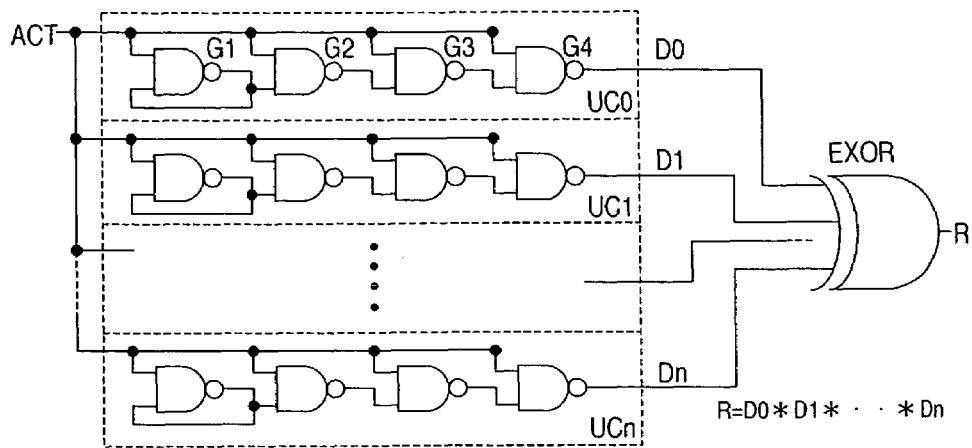
FIG. 3 shows a basic circuit diagram of the true random number generating circuit according to an embodiment of the present invention.

FIG. 3 shows a basic circuit diagram of a random number generating circuit according to an embodiment of the present invention. In this embodiment, the inverter circuits INV1 to INV4 in FIG. 1 are replaced by two-input NAND gate circuits G1 to G4. In the gate circuit G1, an input is connected to an output, The I/O shared by the gate circuit G1 is connected to one input of the gate circuit G2. The output of the gate circuit G2 is connected to one input of the gate circuit G3. The output of the gate circuit G3 is connected to one input of the gate circuit G4. An operation control signal ACT is commonly supplied to the other inputs of the gate circuits G1 to G4.

The inverter circuits INV1 to INV4 in FIG. 1 can be considered to be as one type of the logic gate circuits such as the NAND gate circuits G1 to G4. This is because the circuits perform logic operation for reversing the input signal. When the inverter circuits INV1 to INV4 are used like in FIG. 1, like the inverter circuits INV1 and INV2, the initial stage side operate in the vicinity of the logical threshold value voltage VLT and DC current flows between the power source voltage VDD and the ground potential. As has been described above, the present invention utilizes the normal distribution of the logic threshold value voltages caused by the element process irregularities. Accordingly, it is necessary to operate a comparatively large number of unit circuits and the DC current in the inverter circuits INV1 and INV2 cannot be ignored when lower power consumption should be realized.

As compared to this, when the gate circuits G1 to G4 are used like in this embodiment, and when the operation control signal ACT is set to an inactive level such as low level (logical 0), the respective gate circuits G1 to G4 make the output signal high level (logical 1) regardless of the other input signal different from the operation control signal ACT and no DC current is generated in each of the gate circuits G1 and G2. That is, in the circuit of this embodiment, the operation control signal ACT is set to an active level like high level (logical 1) at the timing requiring a random number. Thus, the respective gate circuits G1 to G4 operate as inverter circuits for forming a reversed signal in response to the other input signal different from the operation control signal ACT. Thus, by setting the operation control signal ACT to a high level, the operation similar to the basic circuit diagram of FIG. 1 is performed.

Figure 4:
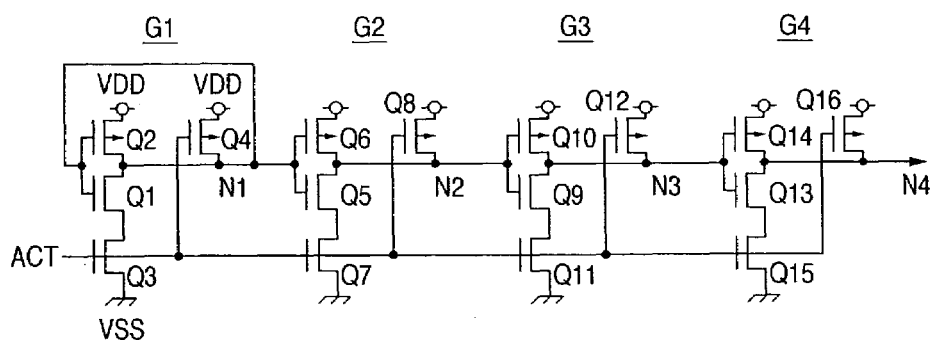
FIG. 4 shows a specific circuit diagram of the true random number generating circuit in FIG. 3 according to an embodiment.

FIG. 4 shows a specific circuit diagram of the true random number generation circuit of FIG. 3 according to an embodiment. The gate circuit G1 is formed by N-channel MOSFET Q1 and Q3 connected in series between the output node N1 and the circuit ground potential VSS and P-channel MOSFET Q2 and Q4 connected in parallel between the output node N1 and the power source voltage VDD. The gates of the MOSFET Q1 and Q3 are commonly connected to serve as a first input. The gates of the MOSFET Q2 and Q4 are commonly connected to serve as a second input. The other gate circuits G2 to G4 are similarly configured.

The gate circuits G1 to G4 are configured so as to have identical characteristic within an actually controllable range in the stage of design and fabrication of the semiconductor integrated circuit device. A brief explanation will be given below on the technique to make a plurality of gate circuits to have identical characteristic. In the gate circuits G1 to G4, it is considered that the logical threshold values as their characteristic are decided by the P-channel MOSFET and the N-channel MOSFET constituting them. In this viewpoint, it is considered that CMOS gate circuits having identical characteristic can also be configured by MOSFET having the identical ratio W/L between the channel width W and the channel length L but different sizes. However, the affect of the fabrication irregularities of the semiconductor integrated circuit device to the electric characteristic is different for the element of different size.

In this embodiment, each of the gate circuits G1 to G4 is preferably configured with identical structure and identical size between the elements constituting them, i.e., between the P-channel type MOSFETs and between the N-channel MOSFETs. It goes without saying that the elements are fabricated by the same process all at once according to the characteristic of the semiconductor integrated circuit device. Thus, the gate circuits G1 to G4 are uniformly affected by the irregularities of the treatment dimension in the fabrication of the semiconductor integrated circuit device, irregularities of thickness of various types of layers, irregularities of impurities concentration, and the like as fabrication irregularities and have the logic threshold value voltage normally distributed.

In the embodiment shown in FIG. 3, a judgment output of the sizes of the logic threshold values of the two gate circuits G1 and G2 is outputted from the gate circuit G2. The aforementioned electric signal noise is superposed on the signal transmission and the amplification path, so that an output signal reflected in the electric signal noise is obtained. That is, the voltage (equivalent to the logic threshold value) of the short-circuited I/O node of the gate circuit G1 is supplied as an input bias of the gate circuit G2. The output signal reflected in the electric signal noise is amplified by the gate circuits G3 and G4 of the latter stage so as to obtain a binary signal of the CMOS level. Accordingly, strictly speaking, the gate circuits G3 and G4 merely perform amplification operation and need not be configured in such a way that the P-channel type MOSFETs and N-channel type MOSFETs respectively have an identical structure and an identical size like the gate circuits G1 and G2. However, in this embodiment, they are respectively configured with an identical structure and an identical size mainly from the viewpoint of the circuit design.

Figure 5:
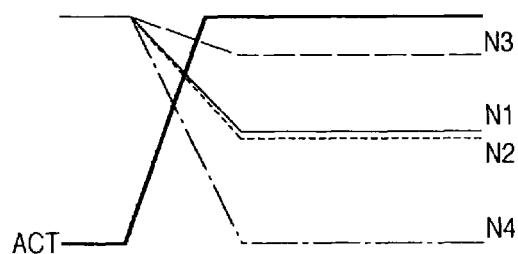
FIG. 5 shows a waveform diagram for explaining an example of operation of the true random number generating circuit in FIG. 3.

FIG. 5 is a waveform diagram for explaining an example of operation of the true random number generating circuit in FIG. 3. In FIG. 5, the electric signal noise in the signal transmission path is omitted. When the operation control signal ACT is changed from the low level to the high level, the gate circuits G1 to G4 substantially enter operation state and the output node N1 of the gate circuit G1 is set to a voltage corresponding to its logic threshold value. It should be noted that the time required for this will be called a convergence time. The gate circuit G2 judges the voltage of the node N1 by its logic threshold value and decides a potential of its output node N2. In this example, since the gate circuit G1 has a logic threshold value slightly greater than the logic threshold value of the gate circuit G2, the potential of the node N2 is made smaller voltage with respect to the node N1 by the amplification operation of the gate circuit G2. The voltage of the node N2 is amplified by the gate circuit G3 and set to a high level like the node N3. The voltage of the node N2 is further amplified by the gate circuit G4 to reach the ground potential VSS of the circuit like the node N4.

When the potential difference between the nodes N1 and N2 is small and the electric signal noise generated there has become lower than the node N2, the output signal is reversed. That is, like in the FIG. 2(a), when an electric signal noise reversing the potential difference between the nodes N1 and N2 is generated, i.e., the basic circuit has a combination of gate circuits G1 and G2 having only such a slight voltage difference that the potential difference relationship between the nodes N1 and N2 is reversed by the electric signal noise, the output can generate a true random number reflecting the electric noise of the basic circuit. It goes without saying that the true random number is generated after the convergence time has elapsed. If during the convergence time, it is difficult to obtain a true random number reflecting the inherent minute electric noise while being affected by the transient state of the node of each NAND gate.

In this embodiment, when the circuit is in a stop state, i.e., when the operation control signal ACT is at the low level, the N-channel MOSFET Q3, A7, Q11, Q15 in FIG. 3 turn OFF, thereby suppressing the through current like when the CMOS inverter circuit is used. Moreover, the advantage of use of the NAND circuit as the gate circuit is that it is a standard element of the CMOS logic LSI which does not limit the product to be applied. That is, since this embodiment is configured by a completely logic description-type circuit, the circuit designing becomes easy.

In the embodiment shown in FIG. 4, the operation control signal ACT is connected to the gates of the N-channel MOSFET Q3, Q7, Q11, Q15 connected in series. However, it is also possible to connect them to the N-channel MOSFET Q1, Q5, Q9, Q13 and to connect the nodes N1, N2, N3 to the gates of the N-channel MOSFET Q3, Q7, Q11, Q15.

What is important in the transistor level circuit description is the signal connection position of the MOSFET in each NAND element. In the aforementioned stop state, outputs of the respective gate circuits G1 to G4, i.e., the potential of the nodes N1, N2, N3 automatically become the power source voltage. Accordingly, this has an effect to prevent fluctuation of the characteristic of the P-channel MOSFET to which the signals are connected, by NBTI.

The MOS transistor may fluctuate in an undesired way by such a field stress that its threshold value voltage depends on the electric field intensity and temperature. Especially, the phenomenon called NBTI (Negative Bias Temperature Instability) is remarkably observed in the P-channel type MOSFET. To prevent this, a method to increase the voltage applied to the gate of PMOS during a time other than the target time is often used. In this embodiment, the gate voltage is set to a fixed voltage so that the logic threshold value judgment operation is performed by the high level of the operation control signal ACT and during a time other than the logic threshold value judgment operation, the operation control signal ACT is set to the low level and the power source voltage is supplied to the gate of the P-channel type MOSFET. Thus, in the P-channel type MOSFET, the gate, the drain, and the source as well as the substrate (channel) all have voltage identical to the power source voltage, which suppresses the fluctuation of the logic threshold value caused by the variation of the MOSFET by time. This is especially advantageous when an identifier is obtained by a combination of the output signals of the unit circuits as has been described above.

On the other hand, the random number generating circuit has a characteristic that it is basically not affected by the aforementioned fluctuation of the element characteristic or fluctuation of the power source voltage. In the random number generating circuit of this embodiment, among the comparatively plenty of unit circuits, it is sufficient that there exists at least one unit circuit in which the logic threshold value voltages of the gate circuits G1 and G2 are considered to be identical viewed from the electric signal noise. The reason is as follows. When fluctuation of the element characteristic or the fluctuation of the power source voltage occurs in the entire unit circuit group, which results in that in a certain unit circuit, the logic threshold value voltages of the gate circuits G1 and G2 are no more identical viewed from the electric signal noise, in another unit circuit, the logic threshold value voltages of the gate circuits G1 and G2 are considered to be identical viewed from the electric signal noise.

Figure 33:
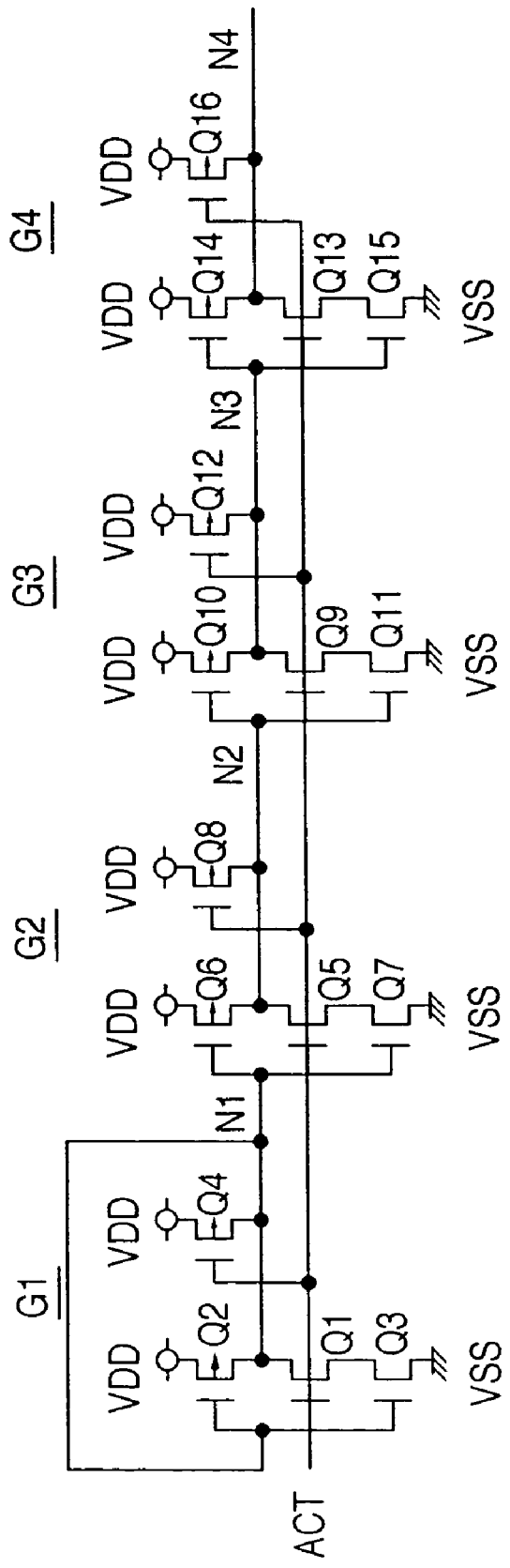
FIG. 33 shows a specific circuit diagram of a modified example of the true random number generating circuit in FIG. 4.
Figure 33:
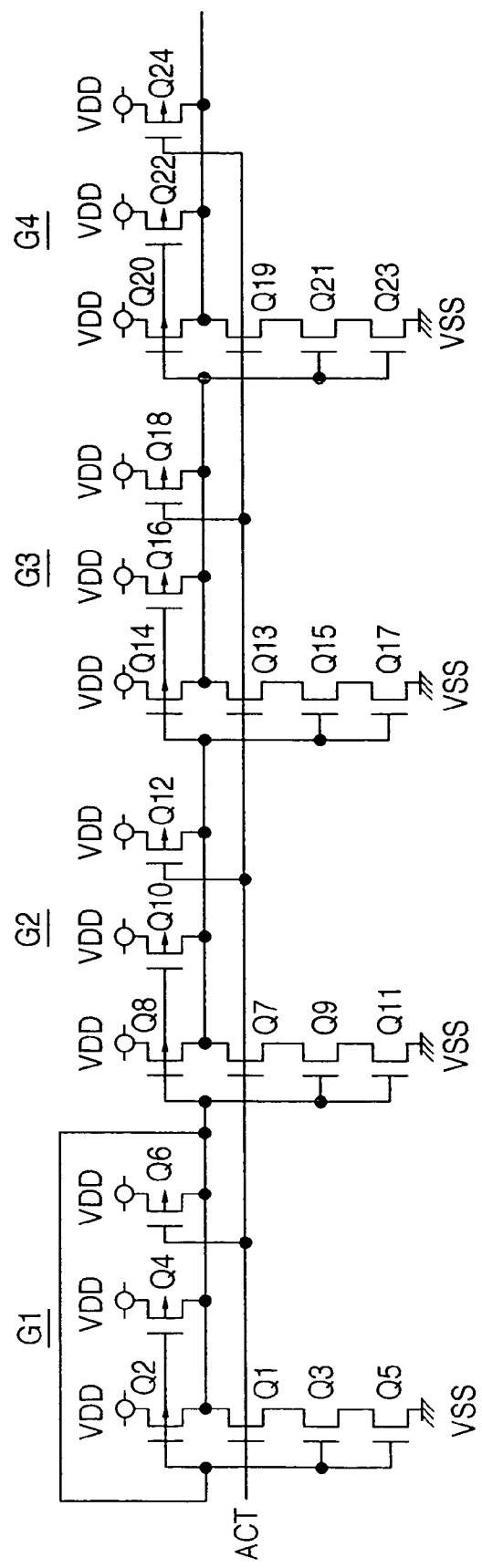

FIG. 33 shows a modified example of the true random number generating circuit in FIG. 4. In FIG. 33(a), in order to suppress irregularities of the electric characteristic of the NAND gate circuits G1 and G2 (equivalent to the inverter circuits INV1 and INV2 in FIG. 1), the transistors constituting the NAND have a channel length L and a channel width W greater than the standard size (the minimum dimensions of the normal process). By increasing the transistor length L and width W, it is possible to suppress irregularities of the characteristic caused by the treatment error of the transistor gate electrode. Moreover, it is possible to suppress irregularities (called "fluctuation phenomenon") caused by statistical fluctuation of the impurities concentration immediately under the gate electrode of the MOS transistor. It is known that in the recent advanced process, the affect of the fluctuation phenomenon near to the treatment error is dominant in the irregularities of the electric characteristic of the MOS transistors on a single chip.

The sizes of the respective transistors constituting the NAND gate circuits G1 and G2 need not be common. However, the P-channel MOSFET Q2 (Q6) and N-channel MOSFET Q1, Q3, (Q5, Q7) relating to the state during the circuit operation, i.e., affecting the decision of the logic threshold value in the aforementioned active state should have a greater size with a higher priority. The corresponding MOSFET of the NAND gate circuits G1 and G2 should have an identical shape.

Moreover, the gate circuits G3 and G4 operating as amplifier circuits need not be set as described above. However, the circuit design or the element layout becomes more simple if the same circuits as the gate circuits G1 and G2 are used. This is also advantageous to conceal the existence of the random number generating circuit as will be detailed later.

FIG. 33(b) shows another implementation method of a circuit which can obtain the same effect as the circuit of FIG. 33(a). That is, the aforementioned Yuragi phenomenon is suppressed by using a 3-input NAND gate, two P-channel MOSFET and two N-channel MOSFET affecting the decision of the logic threshold value in the active state. This has an advantage that it can be realized by gate parts of standard size without designing a MOS transistor of special size.

It should be noted that in FIG. 3, FIG. 4, FIG. 33, a basic circuit is configured by using a NAND gate but it is also possible to use a NOR gate instead of the NAND gate. In this case, however, the basic circuit is activated when the operation control signal ACT is at the low level (logical 0). As has been described above, the degradation caused by electric field stress called NBTI is especially remarkable in the P-channel MOSFET. However, in the other elements such as polysilicon FET and organic transistors in which the degradation phenomenon is remarkable not in the P-channel type but in the N-channel type, it is preferable to use the NOR gate.

It should be noted that in the embodiment shown in FIG. 3, the NAND gates G2, G3, G4 in the respective unit circuits UC0 to UCn may be set always at high level (logical 1) by connecting the common control signal ACT connected to them, to the power source VDD. This does not change the basic function of this embodiment.

Figure 6:
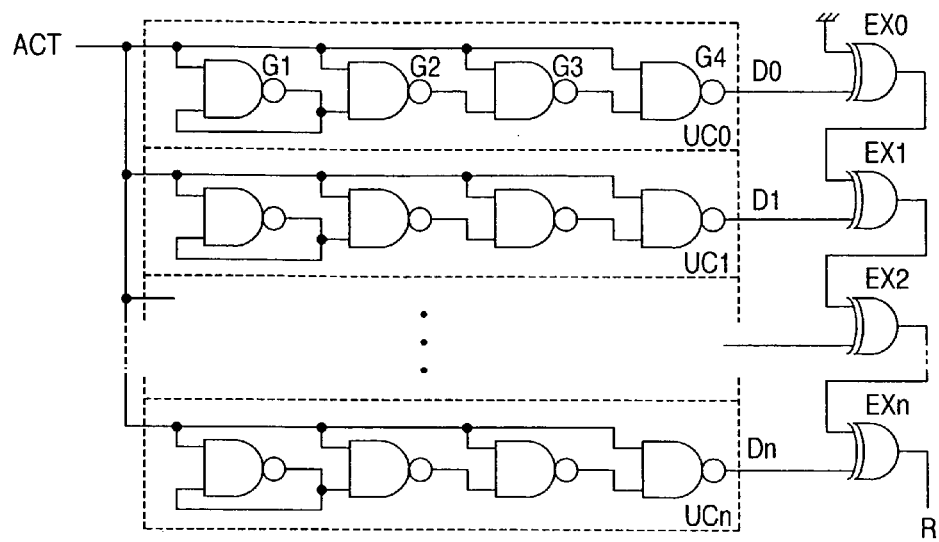
FIG. 6 shows a specific circuit diagram showing a signal variation detecting circuit of the true random number generating circuit in FIG. 4 according to an embodiment.

FIG. 6 shows a specific circuit diagram of the signal variation detecting circuit EXOR of the true random number generating circuit in FIG. 3 according to an embodiment. In this embodiment, exclusive OR circuits EX0 to EXn are connected in series to constitute the signal variation detecting circuit EXOR. A fixed value such as the low level (logical 0) is given to the other input of the exclusive OR circuit EX0 receiving the output D0 of the unit circuit UC0. The output signal of the exclusive OR circuit EX0 is supplied to the other input of the exclusive OR circuit EX1 receiving the output signal D0 of the unit circuit UC1 of the next stage. After this, although not depicted, the output signal of the exclusive OR circuit EXn−1 preceding EXn by one is supplied to the other input of the exclusive OR circuit EXn receiving the output signal Dn of the n+1-th unit circuit UCn.

Thus, if any one of the output signals D0 to Dn of the n+1 unit circuits UC0 to UCn changes, an output signal of the corresponding exclusive OR circuit EX changes and the output signal R of the exclusive OR circuit EXn is changed by the exclusive OR circuit connected in series. That is, the output signal R is a true random number reflecting the electric noise of the unit circuit (basic circuit).

When the signal variation detecting circuit EXOR is configured by a logical gate circuit, it is convenient to use a plurality of exclusive OR circuits as has been described above. However, the configuration is not limited to this. Any configuration may be employed if it can detect a change of the logical level of the output signals D0 to Dn. For example, it is possible to employ a configuration of output signals D0 to Dn and their delay signal forming one-shot pulse.

Figure 7:
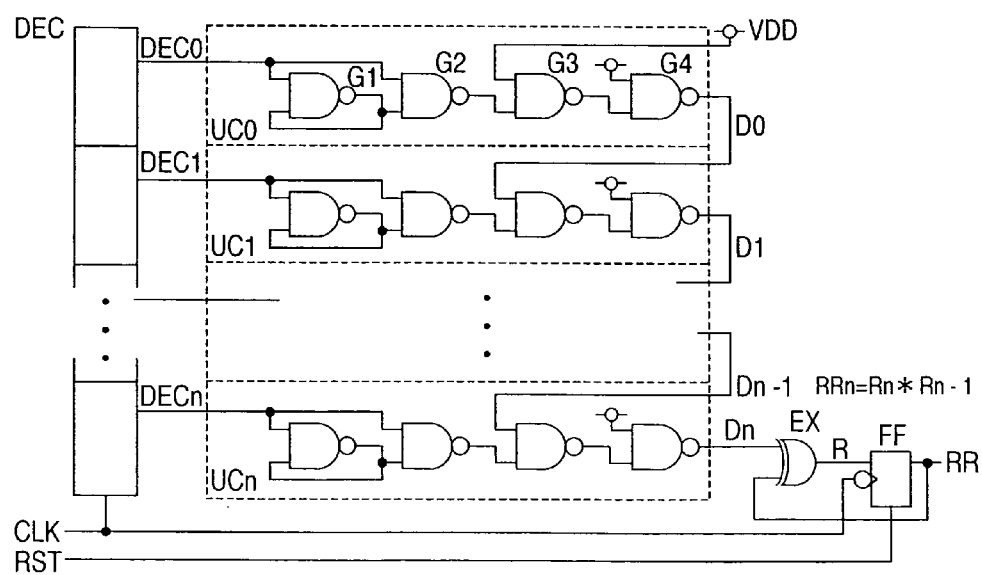
FIG. 7 shows a circuit diagram of a true random number generating circuit according to another embodiment of the present invention.

FIG. 7 is a circuit diagram of a true random number generating circuit according to another embodiment of the present invention. In this embodiment, the unit circuits UC0 to UCn are operated in a temporally dispersed way by using a decoder DEC. By using one exclusive OR circuit EX and one flip-flop circuit FF, exclusive logic of outputs of a plurality of unit circuits UC0 to UCn is accumulated, thereby obtaining a true random number RR. It should be noted that by modifying an exclusive OR to a complicated logic, it is possible to obtain a true random number whose generation pattern becomes more difficult to be decoded.

The decoder DEC is not to be limited to a particular one but is configured by a counter and a decoder. That is, clock CLK is counted by the counter and the counting output is decoded to generate operation control signals DEC0 to DECn for successively activating the unit circuits UC0 to UCn. Alternatively, by using a shift register for successively shifting the initial value corresponding to a selected signal by clock CLK, the operation control signals DEC0 to DECn are formed for successively activating the unit circuits UC0 to UCn.

In order to successively activate the unit circuits UC0 to UCn, in the unit circuit UC0, for example, a decode output DEC0 is supplied as an operation control signal to the gate circuits G1 and G2. When the gate circuits G1 and G2 are activated into the operation state by the operation control signal DEC0, the gate circuits G3 and G4 as the amplifier circuits performs amplification operation of the corresponding output signal. When the gate circuits G1 and G2 are set to the non-operation state by the operation control signal DEC0, the output signal of the unit circuit of the preceding stage is passed through and transmitted.

To one input of the gate circuit G3, the output signal of the corresponding gate circuit G2 is transmitted while to the other input, the output signal of the unit circuit of the preceding stage is transmitted. In the gate circuit G4, the output signal of the corresponding gate circuit G3 is supplied to one input while high level corresponding to the power source voltage is fixedly supplied to the other input. Thus, the gate circuit G4 substantially operates as an inverter circuit. To the other input of the gate circuit G3 of the unit circuit UC0 of the initial stage, high level corresponding to the power source voltage is fixedly supplied.

Figure 8:
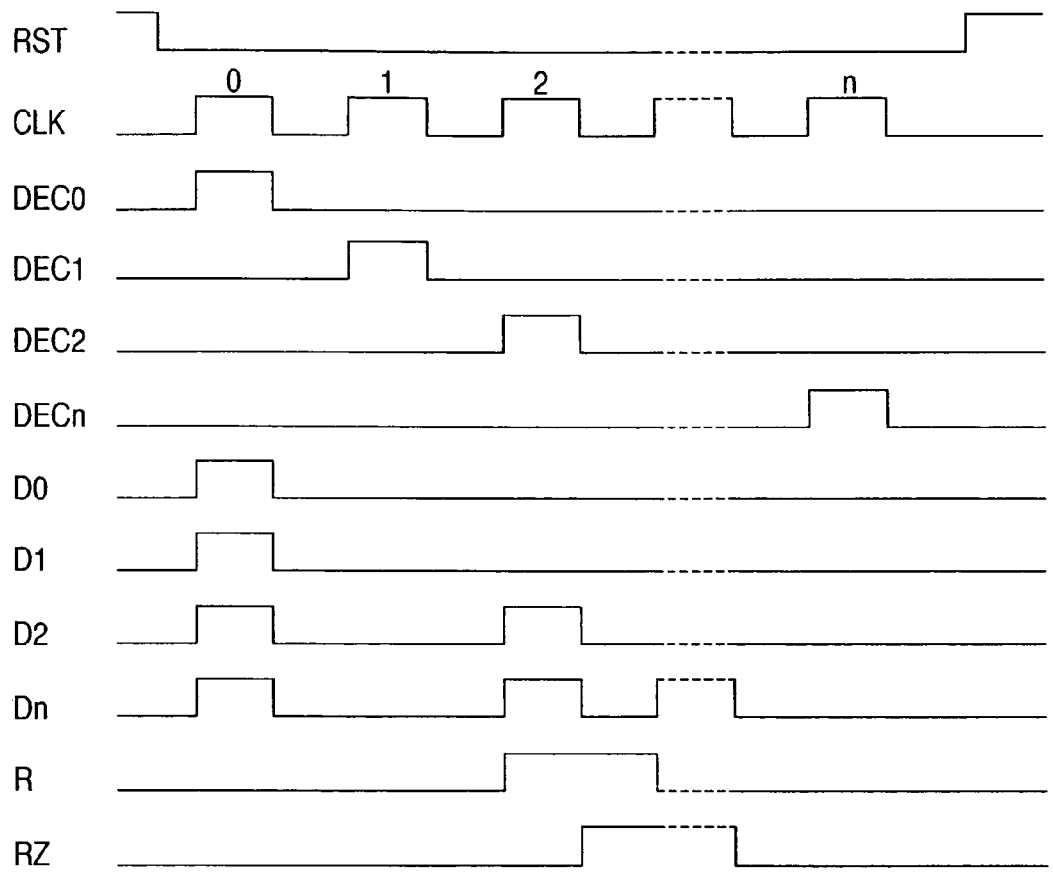
FIG. 8 shows a conceptual waveform diagram for explaining an example of operation of the true random number generating circuit in FIG. 7.

FIG. 8 is a conceptual waveform diagram for explaining an example of operation of the true random number generating circuit in FIG. 7. When the operation control signal DEC0 corresponding to the unit circuit UC0 of the initial stage is set to a selection level of high level by the decoder DEC, the gate circuits G1 and G2 form an output signal, which is amplified by the gate circuits G3 and G4 to form an output signal D0. In the unit circuits UC1 to UCn, the operation control signals DEC1 to DECn are at non-selection level of low level and the output signals of the gate circuits corresponding to the gate circuit G2 become all high level. Accordingly, the gate circuit equivalent to the gate circuit G3 operates as an inverter circuit only to amplify the output signal from the circuit of the preceding stage. As a result, the output signal D0 of the unit circuit UC0 of the initial stage is transmitted via the gate circuits of the unit circuits UC1 to UCn to the exclusive OR circuit EX. That is, D1 to Dn are set to the level based on D0.

When the operation control signal DEC1 corresponding to the second unit circuit UC1 is set to the selection level of high level by the decoder DEC, like in the aforementioned case, the two gate circuits corresponding to the gate circuits G1 and G2 form an output signal, which is amplified by the gate circuits G3 and G4 to form an output signal D1. That is, in the unit circuit of the initial stage, the selection signal DEC0 is at low level, which results in that the output signal of the gate circuit G2 is at high level, and the output signal D0 is fixed to high level. Accordingly, in the unit circuit UC1, as has been described above, amplification is performed by the gate circuits corresponding to the gate circuits G3 and G4. Hereinafter, the output signal D1 is transmitted to the exclusive OR circuit EX via the gate circuits as the amplifier circuits in the unit circuit of the latter stage like in the aforementioned case. That is, D2 to Dn are set to the level based on D1. The selection operation of the third unit circuit UC2 and after up to UCn is also as has been described above.

The circuit of the embodiment in FIG. 7 actually forms different waveforms from those in FIG. 8. That is, when the unit circuit UC0 is in the non-selection state, the output signal D0 is at high level. In other words, when the DEC1 has become non-selection level, the output signal D0 forms an output signal of high level corresponding to the non-selection state. This means that when the unit circuits UC1 to UCn are set to the non-selection level, the output signals D1 to Dn also become high level all at once. If the levels of the output signals D0 to Dn are faithfully expressed in accordance with the non-selection state, it becomes difficult to understand that the unit circuits UC0 to UCn successively operate and their outputs are successively (serially) performed. Accordingly, the outputs are shown as in FIG. 8 ignoring the variation of the output levels of the UC0 to UCn in the non-selection state.

The circuit of the embodiment in FIG. 7 shows a unit circuit group containing (N+1) unit circuits (basic circuits). Among the (n+1) basic circuits, there exists at least one unit circuit of a combination of the first gate circuit G1 (the first inverter circuit INV1) and the second gate circuit G2 (the second inverter circuit INV2) having quite similar characteristics. As has been described above, as the number of unit circuits having the combination of the first gate circuit G1 and the second gate circuit G2 whose characteristics are quite similar, a random number of higher quality is obtained. In order to obtain a sufficient number of unit circuits having the first gate circuit G1 and the second gate circuit G2 whose characteristics are quite similar, it is necessary to increase the probability of existence of the unit circuits having the first gate circuit G1 and the second gate circuit G2 whose characteristics are quite similar and set a number of units circuits contained in the unit circuit group appropriate for the probability. The probability of existence of the unit circuit having a combination of the first gate circuit G1 and the second gate circuit G2 whose characteristics are quite similar greatly depends on the fabrication process and the design method of the circuit (depending on the yield). Accordingly, it is important to optimize the number of unit circuits contained in the unit circuit group.

Moreover, as another means for improving the quality of random numbers, it is also advantageous to increase the number of accumulation calculations using the exclusive OR circuit EX and the flip-flop circuit FF. More specifically, in the operation waveform shown in FIG. 8, the accumulation of the (n+1) circuits is multiplied by m, for example, such as (n+1)×m. That is, pre-outputs D0 to Dn of the unit circuits UC0 to UCn are read out m times so as to decide a 1-bit random number R (RR).

Figure 9:
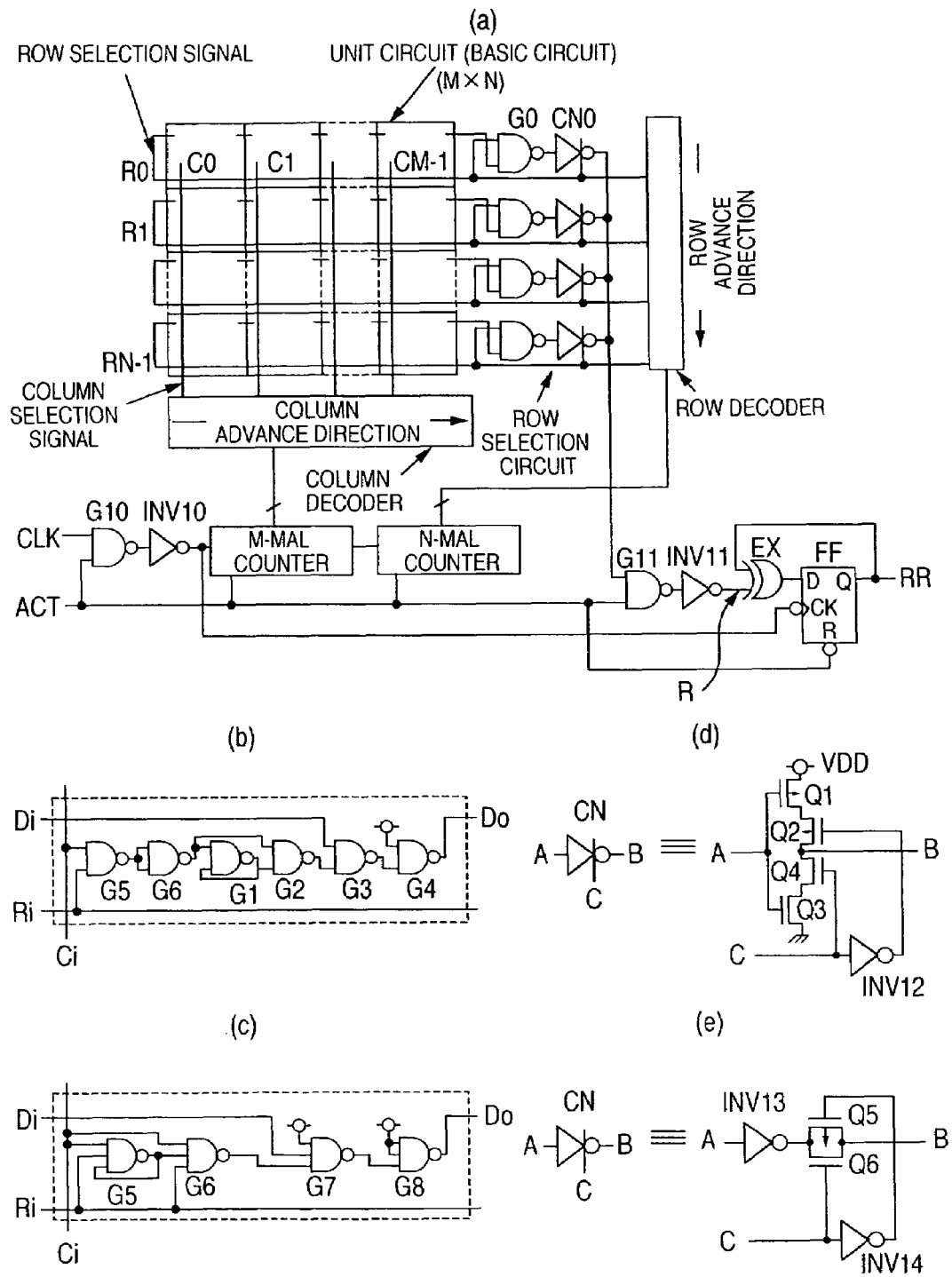
FIG. 9 shows a circuit diagram of a true random number generating circuit and its unit circuit according to an embodiment of the present invention.

FIG. 9 shows a true random number generating circuit according to the present invention and a circuit diagram of its component circuit according to an embodiment. In the true random number generating circuit shown in FIG. 9(a), M×N unit circuits (component circuits) as shown in FIG. 9(b) are arranged in a matrix.

One row is connected like the circuit in FIG. 7 and its output unit has a NAND gate circuit G0 selected by the row selection signal and clocked inverter circuit CN0. Among the M unit circuits constituting each of the rows corresponding ones are commonly selected by column selection signals C0 to CM−1 formed by a column decoder. Among the N unit circuits arranged in the row direction, one is selected by the row selection signals R0 to RN−1 formed by a row decoder. The row selection signals R0 to RN−1 are also used as selection signals of the row selection circuit formed by the NAND gate circuit G0 and the clocked inverter circuit CN0. The clocked inverter circuit CN0 constituting the selection circuit becomes output high-impedance state when it is the non-operation state. Accordingly, the output signals of the N clocked inverter circuits are commonly connected and the output signal of the clocked inverter circuit corresponding to the selected one row is transmitted to the NAND gate circuit G11.

Clock CLK is supplied M-mal counter via the NAND gate circuit G10 and the inverter circuit 10 in which the gate is controlled by the operation control signal ACT. Thus, when the operation control signal ACT is in the active state, the M-mal counter performs counting operation 0 to M−1 corresponding to the clock CLK. The row decoder forms the selection signals C0 to CM−1 and the output signals of the unit circuits are output in serial like in the embodiment of FIG. 7.

Since the carry signal of the M-mal counter is supplied to the N-mal counter, N-mal counter performs counting operation in accordance with one turn of the M-mal counter. Thus, when the M unit circuits arranged in the row direction are read out, the row selection is switched. From $0^{th}$ to (RN−1)-th row, N unit circuits are read respectively.

In this embodiment, all the unit circuits are read out by the M×N cycles and accordingly, it is possible to generate a 1-bit true random number from the output RR by the M×N cycles. This is repeated by K times so as to obtain a K-bit true random number. In this configuration, the number of M×N is selected in such a manner that among the M×N unit circuits, there exists at least one unit circuit responding to the electric signal noise. It should be noted that during the K-time repetitions, it is possible to extract J (0<J<K) random numbers. In this case, however, the random number bit extraction cycle should be apart at least M×N cycles. Moreover, when the number M is selected in such a manner that among the M unit circuits, at least one unit circuit generating the true random number exists, it is possible to obtain a 1-bit true random number RR for each M cycle (for each row). Accordingly, it is possible to configure a true random number generating circuit generating an N-bit true random number by M×N cycles.

FIG. 9(b) shows a specific circuit diagram of a circuit element in FIG. 9(a) according to an embodiment. The unit circuit is formed by the gate circuits G1 to G4 shown in FIG. 7 and gate circuits G5 and G6 for providing the row/column selection function. A column selection signal Ci and a row selection signal Ri are supplied to the two inputs of the NAND circuit G5. Like in the unit circuit in FIG. 7, to the gate circuit G3, an output signal Di of the unit circuit of the preceding by-one stage in the row is supplied. Thus, only one unit circuit whose row and column are in the selected state enters the aforementioned operation state.

FIG. 9(c) shows a specific circuit diagram of the circuit element in FIG. 9(b) according to another embodiment. The unit circuit is formed by a 3-input NAND gate replacing the gate circuits G1 to G4 shown in FIG. 9(b) and FIG. 7 and the NAND gate also has the row/column selection function. The column selection signal Ci and the row selection signal Ri are supplied to two of the three inputs of the NAND gate circuits G5 and G6. Like in the unit circuit in FIG. 9(b) and FIG. 7, to the gate circuit G7, the output signal Di of the unit circuit of the preceding by-one stage in the row is supplied. Thus, only one unit circuit whose row and column are in the selected state enters the aforementioned operation state.

As shown in FIG. 9(d), the clocked inverter circuit CN in FIG. 9(a) is formed by the P-channel MOSFET Q1, Q2 and N-channel MOSFET Q4, Q3 connected in series between the power source voltage VDD and the circuit ground potential VSS. The gates of the P-channel MOSFET Q1 and the N-channel MOSFET Q3 are commonly connected to serve as an input terminal A. The drains of the P-channel MOSFET Q2 and the N-channel MOSFET Q4 are commonly connected to serve as an output terminal B. A control signal supplied from the terminal C is supplied to the gate of the N-channel MOSFET Q4, so that the aforementioned control signal is reversed by the inverter circuit INV12 and supplied to the gate of the P-channel MOSFET Q2.

When the selection signal such as a row selection signal supplied from the terminal C is high level, the N-channel MOSFET Q4 and the P-channel MOSFET Q2 enter the ON state and the output terminal B outputs an output signal corresponding ON/OFF of the N-channel MOSFET Q3 and the P-channel MOSFET Q1 receiving the input signal from the input terminal A. When the selection signal such as a row selection signal supplied from the terminal C is high level, the N-channel MOSFET Q4 and the P-channel MOSFET Q2 simultaneously enter the ON state and the input signal from the input terminal A complementarily sets the N-channel MOSFET Q3 or the P-channel MOSFET Q1 to the ON state. A low level or a high level is outputted from the output terminal B.

Moreover, the clocked inverter circuit CN in FIG. 9(a) may be a transfer gate circuit shown in FIG. 9(e). As shown in FIG. 9(e), the clocked inverter circuit CN is formed by the P-channel MOSFET Q5 and the N-channel MOSFET Q6 connected in series between the input terminal A and the output terminal B. The control signal supplied from the terminal C is supplied to the gate of the N-channel MOSFET Q6 and the control signal is reversed by the inverter circuit INV14 before being supplied to the gate of the P-channel MOSFET Q5. When the selection signal such as the row selection signal supplied from the terminal c is high level, the P-channel MOSFET Q5 and the N-channel MOSFET Q6 enter the ON state and the input signal from the input terminal A is outputted from the output terminal B. When the selection signal such as the row selection signal supplied from the terminal C is high level, the N-channel MOSFET Q4 and the P-channel MOSFET Q2 simultaneously enter the ON state and the input signal from the input terminal A complementarily sets the N-channel MOSFET Q3 or the P-channel MOSFET Q1 to the ON state. A low level or a high level is outputted from the output terminal B. Moreover, when the selection signal such as the row selection signal supplied from the terminal C is low level, the N-channel MOSFET Q4 and the P-channel MOSFET simultaneously enters the OFF state and the output terminal B becomes high impedance.

Figure 10:
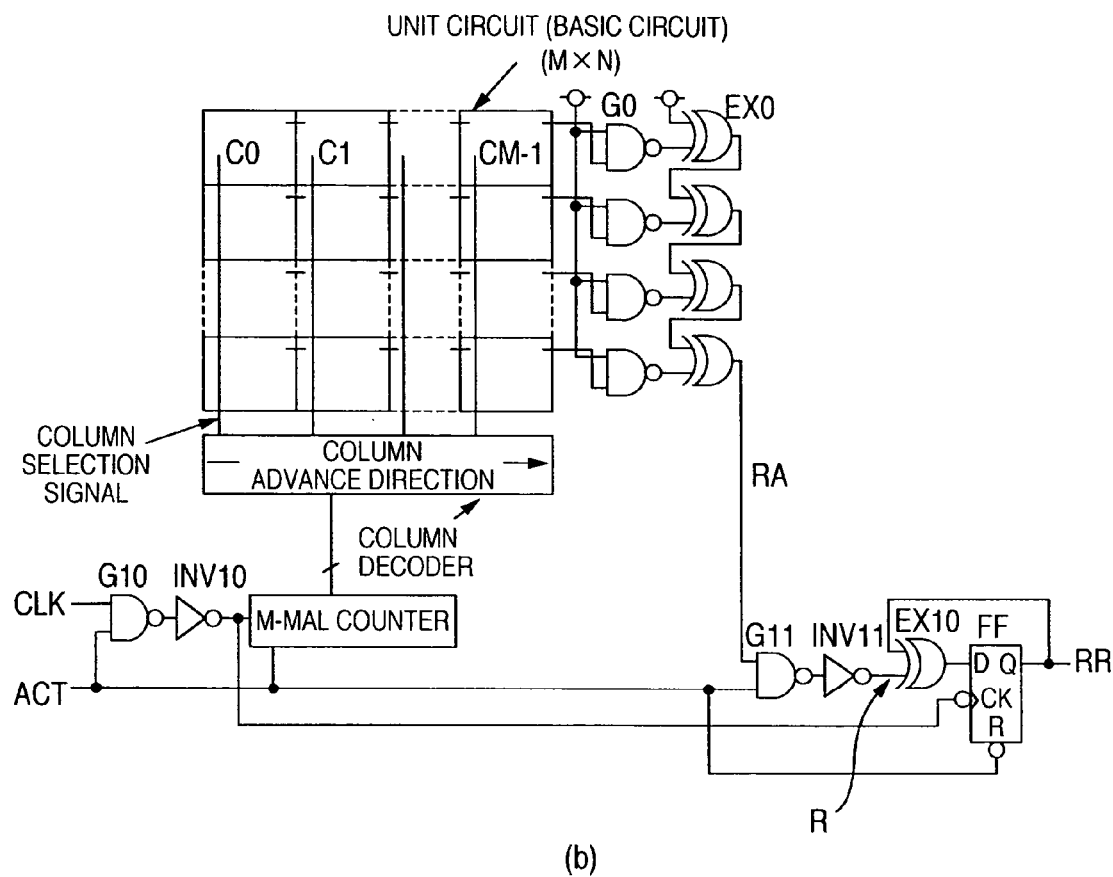
FIG. 10 shows a circuit diagram of a true random number generating circuit and its unit circuit according to another embodiment of the present invention, FIG. 11 briefly shows waveforms for explaining an example of operation of the true random number generating circuit in FIG. 9.
Figure 10:
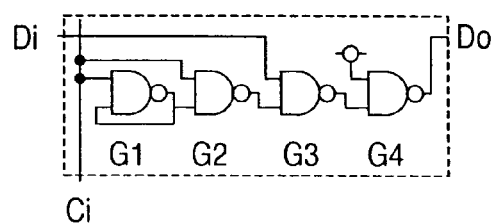

FIG. 10 shows a circuit diagram of a true random number generating circuit and its element circuit according to another embodiment of the present invention. In the true random number generating circuit shown in FIG. 10(a), a plurality of the unit circuits shown in FIG. 10(b) are arranged in a matrix of M (columns)×N (rows). One row is connected like the circuit in FIG. 7 and its output unit has the NAND gate circuit G0 and the exclusive OR circuit EX0. The NAND gate G0 has the other input which is connected to the power source VDD and always in the high level (logical 1). Among the M unit circuits constituting each of the rows, the corresponding unit circuits are commonly selected by the column selection signals C0 to CM−1.

Clock CLK is supplied to the M-mal counter via the NAND gate circuit G10 and the inverter circuit INV10 whose gates are controlled by the operation control signal ACT. Thus, when the operation control signal ACT is in the active state, the M-mal counter performs counting operation 0 to M−1 corresponding to the clock CLK. The column decoder forms the selection signals C0 to CM−1 and the output signals of the unit circuits of the respective rows sharing the Ci formed by N rows are outputted serially like in the embodiment of FIG. 7.

The output of the NAND gate circuit G0 is connected to the exclusive OR circuit EX0 and the other input of the EX0 is connected to. Furthermore, the output of the exclusive OR circuit EX0 is connected to the exclusive OR circuit of the adjacent row. The outputs of all the exclusive OR circuits are successively connected to the adjacent row in the longitudinal way. A fixed value such as the high level (logical 1) is given to the other input of the exclusive OR circuit. Thus, if any one of the N output signals generated by the N-row unit circuits sharing the selected Ci changes, the output signal RA of the exclusive OR circuits connected vertically.

That is, the output signal RA becomes a value reflecting the electric noise of the N unit circuits (basic circuits) by one-cycle operation.

In this embodiment, since all the unit circuits are read by M cycles, it is possible to generate a 1-bit true random number from the output RR by M cycles. By repeating this K times, it is possible to obtain a K-bit true random number. With this configuration, the number M×N is selected so that at least one unit circuit responding to the electric signal noise exists among the M×N unit circuits. It should be noted that during the K times of repetition, it is possible to extract J (0<J<K) random numbers. In this case, however, each random number bit extraction cycle should be apart at least by M cycles.

FIG. 10 (b) shows a specific circuit diagram of the circuit element in the true random number generating circuit shown in FIG. 10(a) according to an embodiment. The column selection signal Ci is supplied to one of the two inputs of the NAD gate circuits G1 and G2. The output signal Di of the unit circuit of the preceding by-one stage in the row is supplied to the gate circuit G3 like in the unit circuit of FIG. 7. This set only one unit circuit whose column is in the selected state enters the aforementioned operation state.

Figure 11:
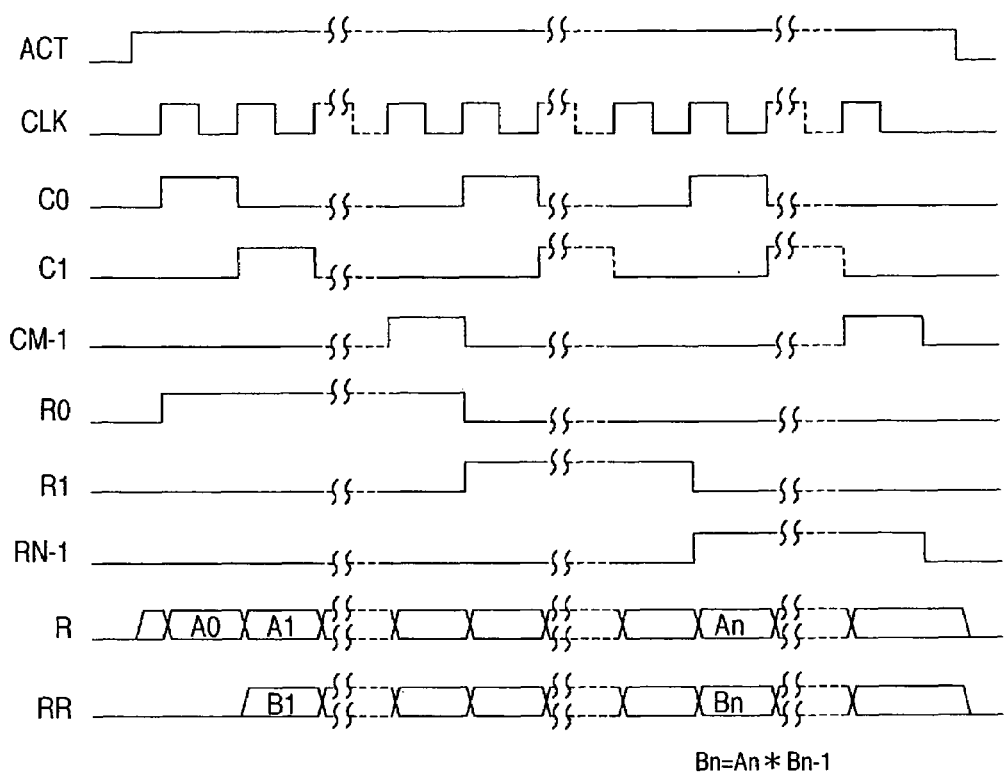

FIG. 11 is a brief waveform diagram for explaining an example of the operation of the true random number generating circuit of FIG. 9. If the clock CLK is inputted when the operation control signal ACT is at the activated level of high level, the column selection signals C0 to CM−1 are outputted from the column decoder in response to that. At this moment, the N-mal counter has a count value zero and the row selection signal R0 of the 0-th row is set to the selection level. Accordingly, the output signals of the units circuits of the 0-th row are outputted serially corresponding to the column selection signals C0 to CM−1. When read of the unit circuit of the 0-th row is performed, the carry signal increments the N-mal counter by +1. The 0-th row R0 is set to the non-selection state and the first row R1 is set to the selection state instead. Thus, the units circuits up to the (N−1)-th row are successively read. The true random number RR is decided by the exclusive OR of the serial output R of the unit circuit and the output preceding by one. It should be noted that the operation waveform diagram of the true random number generating circuit of FIG. 10 is similar to that of FIG. 9 and is omitted. The difference from FIG. 9 is that the selections signals R0 to RN−1 are absent. Thus, there is no need of operation for advancing the N-mal counter and M cycles are required for selecting all of the M×N unit circuits (basic circuits).

Figure 12:
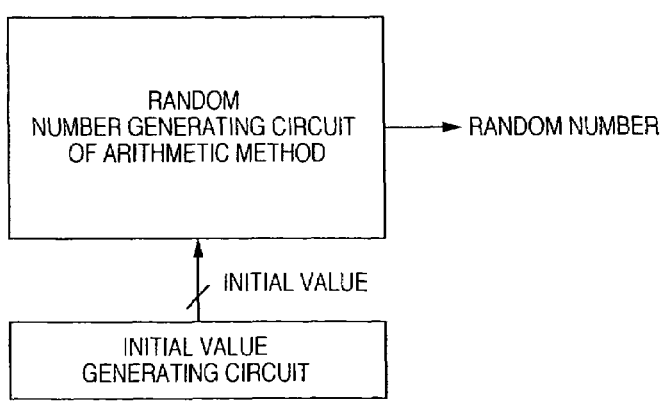
FIG. 12 shows a conceptual diagram of a true random number generating circuit according to another embodiment of the present invention.

FIG. 12 shows a conceptual diagram of a true random number generating circuit according to another embodiment of the present invention. In this embodiment, a random number is generated by a method using a combination of the arithmetic random number generating circuit and the physical phenomenon according to the present invention. As has been described above, the arithmetic random number generating circuit can be realized by a circuit of comparatively small size but the quality of the random number obtained by that is not high. Especially it has an essential defect that a periodicity appears when a plenty of random numbers are obtained. The periodicity may be reduced by inserting the irregular element in response to the electric signal noise in the random number generating circuit according to the present invention.

Figure 13:
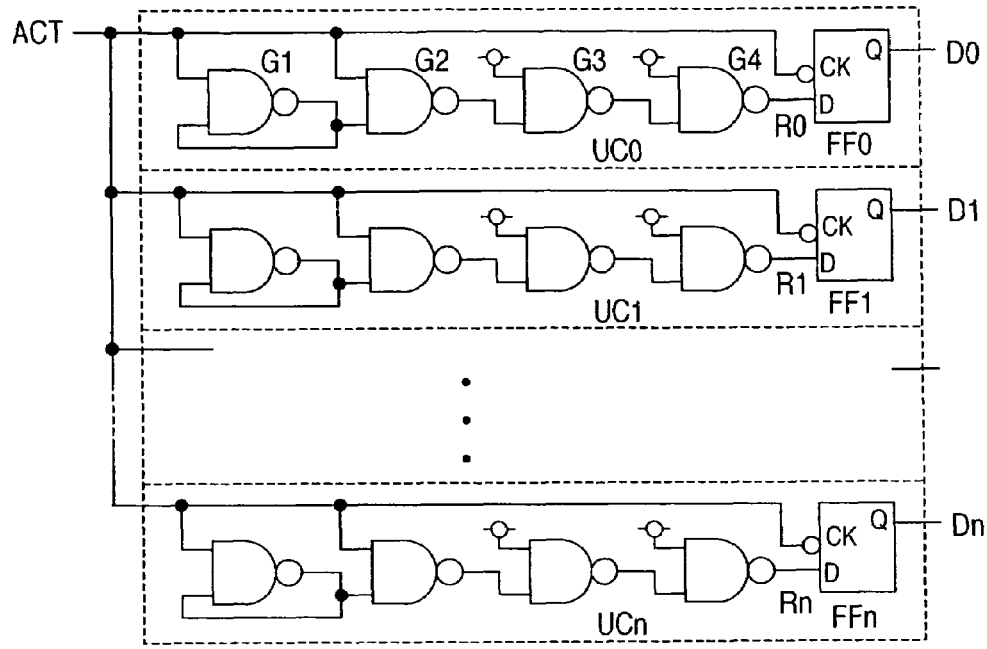
FIG. 13 shows a circuit diagram of an initial value generating circuit in FIG. 12 according to an embodiment.

FIG. 13 shows a circuit diagram of the initial value generating circuit of FIG. 12 according to an embodiment. This embodiment is basically identical to the embodiment of FIG. 6. The difference from FIG. 6 is that the exclusive OR circuits EX0 to EXn are replaced by flip-flop circuits FF0 to FFn. The initial values such as D0 to Dn are obtained from the flip-flop circuits FF0 to FFn.

Most of the signals D0 to Dn become fixed values because of the process irregularities. Any one or several bits of them become a random number responding to the electric signal noise and it is possible to sufficiently exhibit the function as the initial value of the arithmetic random number generating circuit.

Figure 14:
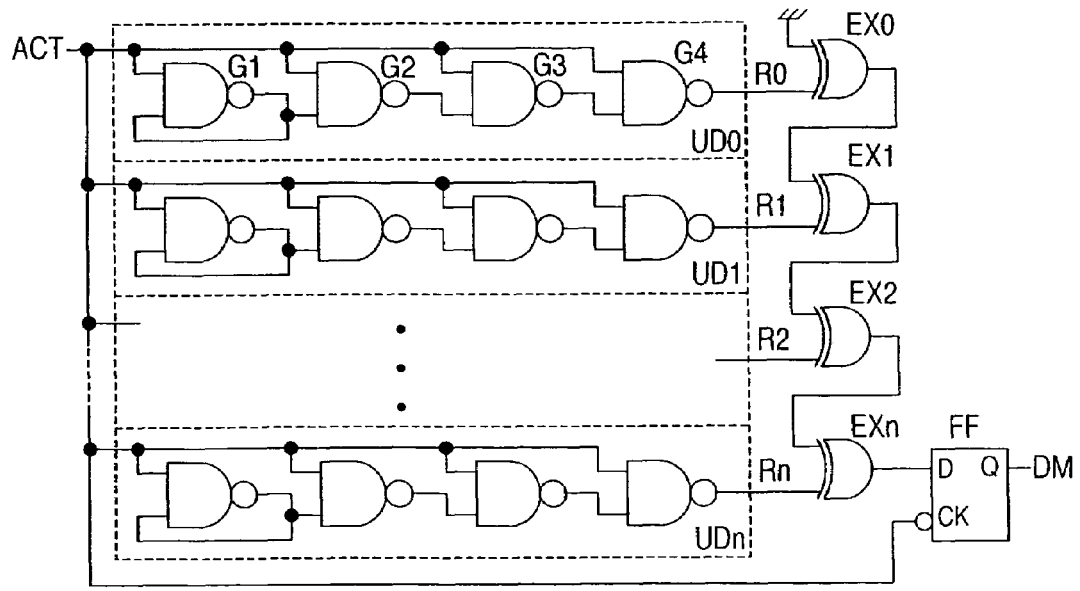
FIG. 14 shows a circuit diagram of an initial value generating circuit in FIG. 12 according to another embodiment.

FIG. 14 shows a circuit diagram of the initial value generating circuit of FIG. 12 according to another embodiment. This embodiment is basically identical to the embodiment of FIG. 6. The difference from FIG. 6 is that a 1-bit random number is outputted from the flip-flop circuit FF by the activation signal ACT. That is, in this embodiment, a 1-bit random number is used as the initial value of the arithmetic random number generating circuit.

Figure 15:
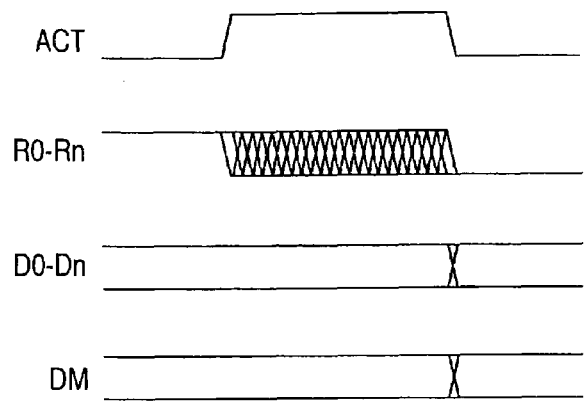
FIG. 15 shows a waveform diagram for explaining operation of the initial value generating circuit in FIG. 13 and FIG. 14.

FIG. 15 shows a waveform diagram for explaining the operation of the initial value generating circuits of FIG. 13 and FIG. 14. When the operation control signal ACDT becomes high level, in the circuit of FIG. 13, the respective unit circuits UC0 to UCn output the output signals R0 to Rn. As has been described above, among the output signals R0 to Rn, some become fixed values while others change corresponding to the electric signal noise. When the operation control signal ACT becomes from high level to low level, the random numbers D0 to Dn corresponding to the aforementioned output signals R0 to Rn are supplied to the flip-flop circuits FF0 to FFn and a random number of a plurality of bits D0 to Dn containing fixed values is outputted.

In the circuit of FIG. 14, the output signals R0 to Rn of the unit circuits UC0 to UCn are supplied to the exclusive OR circuit EX0 to EXn and a 1-bit random number corresponding to the signals R0 to Rn is outputted via the exclusive OR circuits EX0 to EXn. Accordingly, when the operation control signal ACT has become from high level to low level, a random number generated then is supplied to the flip-flop circuit FF and a 1-bit random number DM is outputted.

Figure 16:
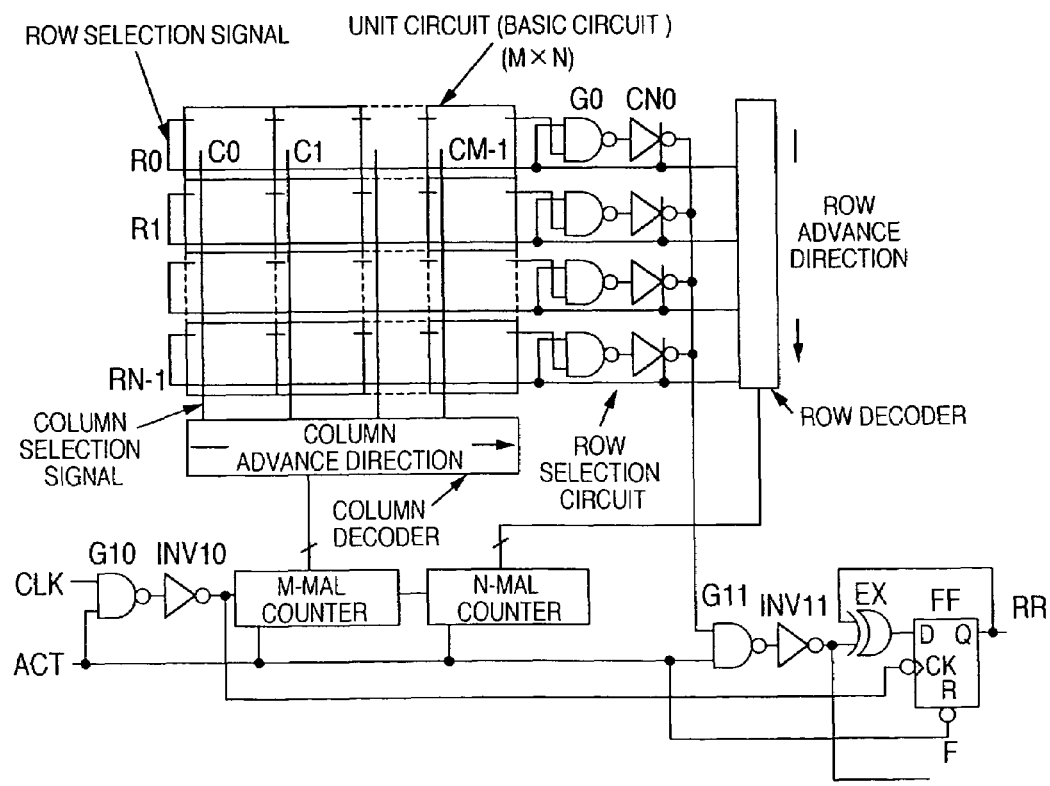
FIG. 16 shows a circuit diagram of a true random number generating circuit according to another embodiment of the present invention.

FIG. 16 shows a circuit diagram of a true random number generating circuit according to another embodiment of the present invention. This embodiment is formed by the true random number generating circuit shown in FIG. 9 and an output terminal for outputting an identifier F. That is, the M×N output signals outputted from the M×N unit circuits are outputted as an identifier F. The identifier F is held in an appropriate storage circuit and registered in a management system. The collation method of this identifier F should allow fluctuation of the identifier corresponding to the true random number responding to the electric signal noise in addition to the difference in the environment and condition between the registration time and the collation time. An appropriate storage circuit stores the identifier F at the moment when the power of the semiconductor integrated circuit device having the true random number generating circuit is turned ON or immediately after the operation activation signal ACT is activated, so that the identifier is used as a number to be identified. Registered identification numbers are successively acquired from the management system. A registered identification number is compared to the number to be identified.

A pair of registered identification number and the number to be identified having a small difference as the comparison result is made a matched candidate. This operation is repeated for the registered identification numbers registered in the management system and finally, the one of the registered identification number having the least difference becomes the most powerful candidate.

In the comparison of a registered identification number to a number to be identified, the output pattern of "0" and "1" of the corresponding bit is unique to each of the registered identification numbers. It is possible to decide whether identification numbers have been outputted from the same semiconductor integrated circuit device by checking the ratio of the coincidence of the number of bits constituting the pattern. Since the fluctuation of the identification number caused by the difference of the environments between the registration time and the collation time and the random number bit is allowed, it is possible to identify a chip by making the one having the least total of the differences between the numbers to be identified and the registered identification numbers as a candidate of coincidence.

Figure 17:
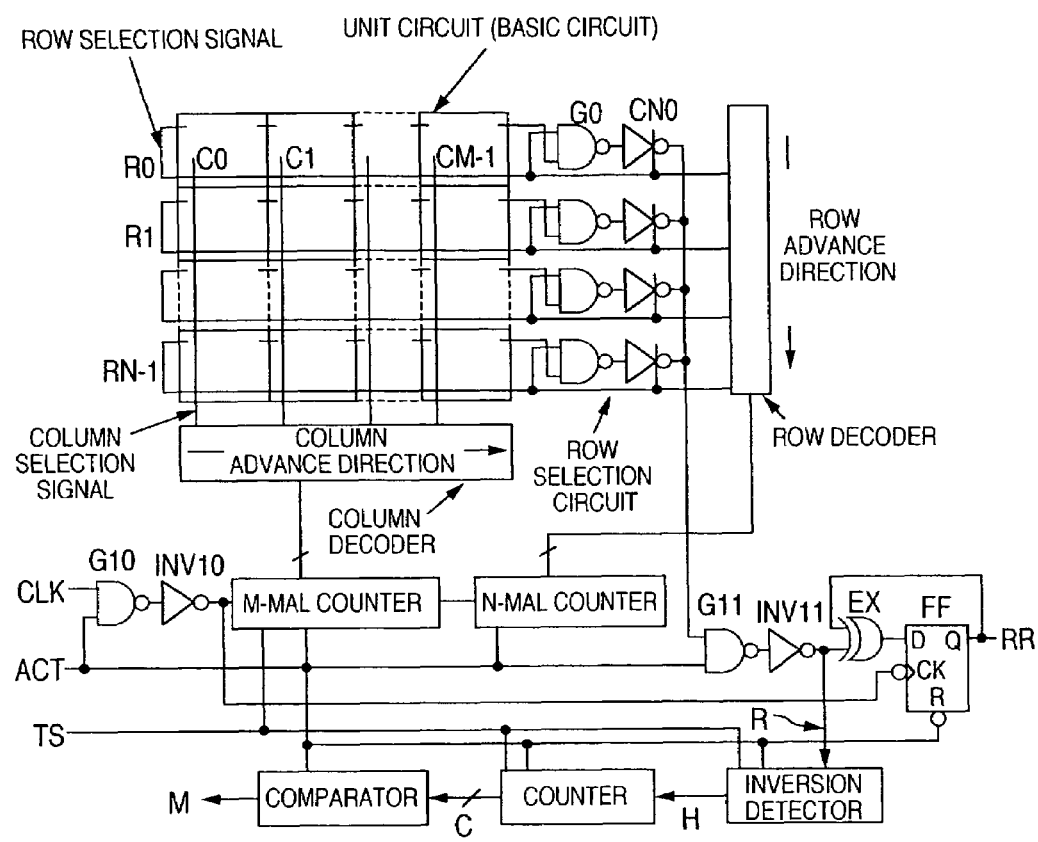
FIG. 17 shows a circuit diagram of a true random number generating circuit according to an embodiment of the present invention.

FIG. 17 shows a circuit diagram of a true random number generating circuit according to an embodiment of the present invention. This embodiment has a basic configuration identical to the embodiment of FIG. 9. In this application attention is paid on that the characteristic irregularities of the MOSFET are distributed at random and a plenty of unit circuits are observed to utilize that there exists a pair of the first inverter circuit INV1 and the second inverter circuit INV2 or the first gate circuit G1 and the second gate circuit G2 having quite similar characteristics with a certain probability. For this, when a true random number generating circuit is fabricated in the semiconductor integrated circuit device, it is indispensable to execute inspection to decide whether a unit circuit actually reflecting the electric signal noise exists.

In this embodiment, a test circuit is attached to the true random number generating circuit for testing itself. The inspection method of this test circuit decides the number of unit circuits having the first gate circuit G1 (the first inverter circuit INV1) and the second gate circuit G2 (the second inverter circuit INV2) having quite similar characteristics contained in the unit circuit group and guarantees to surely catch the electric signal noise based on the physical phenomenon.

Like the extraction of the identifier F in FIG. 16, the circuit node capable of acquiring the output signal from each unit circuit, i.e., the signal R of the output terminal (one of the inputs of the exclusive OR circuit EX) of the inverter circuit INV1 is supplied to a reversion inspector and the detected signal H is counted by a counter. The counting output C is compared by a comparator to obtain a judgment result M. Moreover, for the test operation, a column selection signal is formed by a (4+M)-mal counter. The (4+M)-mal counter repeatedly selects the same unit circuit four times and then proceeds to selection operation of the next unit circuit.

Figure 18:
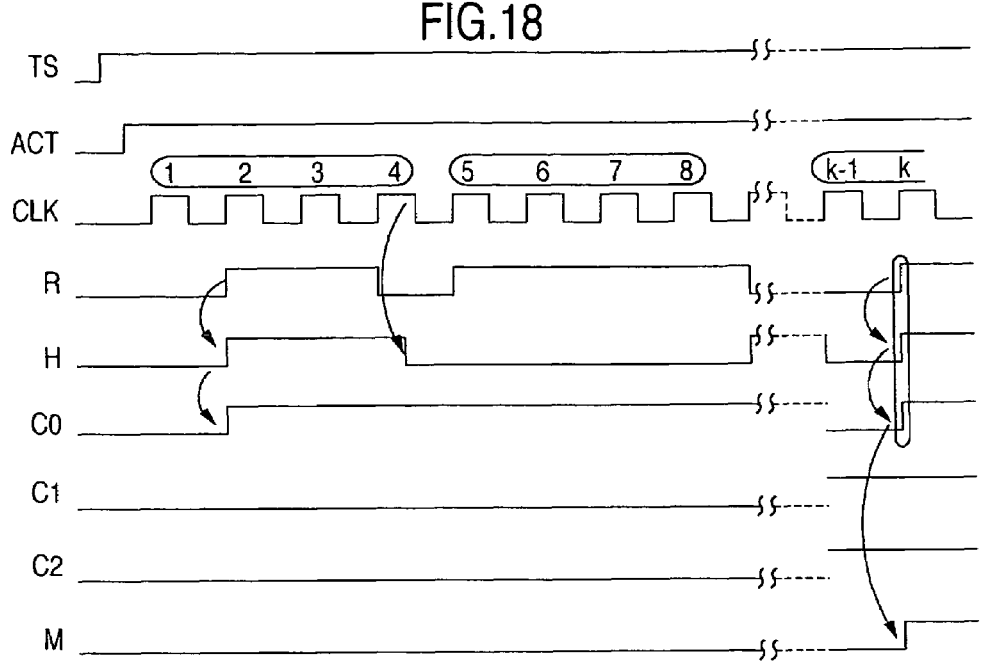
FIG. 18 shows a timing diagram used for explaining an example of operation of a test circuit provided in the true random number generating circuit in FIG. 17.

FIG. 18 is a timing diagram for explaining an example of the operation of the aforementioned test circuit. A test signal TS is set to high level to instruct the (4+M)-mal counter operation. Moreover, the reversion detector and the counter are set to the initial state or to the initial value. The operation control signal ACT is set to high level so that the random number generating circuit enters the operation state. Clock CLK is supplied and read is started at the first unit circuit and then read is continued successively. Here, the (4+M)-mal counter selects the same unit circuit four times continuously for the clock CLK 1 to 4. Thus, the one outputting a fixed value like in FIG. 2 (b), the same signal R is outputted four times.

When the fixed value is outputted, the reversion detector does not perform reversion detection and the counter is not incremented. On the contrary, when there exists one forming the output signal R in response to the electric signal noise Vnz like in FIG. 2(a), the number of reversions during the four accesses is 3 times at maximum. When at least one reversion is performed, the detection result is true. In the figure, the output signal R changes at the second cycle and the fourth cycle. Thus, on the reversion detector, the level of the output H is changed each time.

Thus, when the output H changes at least once, the result is true and the counter value C0 is changed from low level to high level and is incremented by 1. Next unit circuit is selected in the unit circuit group and the aforementioned detection operation is repeatedly performed up to the last unit circuit. When the number (?) of the counters is greater than a predetermined value, the value of the detection result M is made true (high level). In order to obtain a true random number, the predetermined value is basically 1 but it is preferably 2 or 3 or above for safely.

For example, as shown in FIG. 18, when the counter is a 2-bit output binary counter, the comparator detects that the counter outputs C0 and C1 both become high level at the (K−1)-th cycle of the clock CLK and the aforementioned inspection result M is decided to be high level. Then, like in FIG. 2(a), it is confirmed that there exist at least four which form the output signal R in response to the electric signal noise Vnz.

In the aforementioned explanation, one unit circuit is accessed four times by CLK pulse for inspection. However, the number accesses may be twice. When access is made twice, a (2+M)-mal counter is used. In other than the inspection, as has been described above, it operates as an M-mal counter according to the low level of the test signal TS. Alternatively, the counter may be operated directly as the (4+M)-mal counter or the (2+M)-mal counter. In this case, the read cycle is increased by 4 times or twice.

As specification of security products by a governmental organization, there is FIPS 140-2 suggested by NIST (National Institute of Standards and Technology). This defines security requirements (FIPS PUB 140-2, Security Requirements for Cryptographic Modules) to be satisfied by the cryptographic modules of the articles purchased by the government. As for the random number, there is a quality inspection standard by the statistical method. When using the method, the dedicated circuit size for implementing the method is comparatively large and comparatively long time is required for inspection by a semiconductor test device.

As compared to this, the test circuit having the random number generating circuit according to the present invention can make a judgment at the moment when a circuit is completed on a semiconductor wafer without connecting it to a tester having the aforementioned inspection function. Moreover, the semiconductor integrated circuit device can make a judgment by itself upon shipment. Furthermore, if necessary, after the moment when the true random number generating circuit is mounted on a system, it can be checked when necessary or periodically to decide whether the true random number generating circuit can operate normally. This provides a true random number generation with a high reliability. All these can be performed because they are supported statistically.

That is, a diagnosis (test) of a true random number generating circuit is equal to evaluation of the quality of the random number and requires a certain statistic process. For this, there are significant problems such as a test device, a test time, and a long-term reliability guarantee. Especially after the true random number generating device is mounted on a LSI or a final system, it is quite important whether the circuit itself is normally operating. This is because, unless a true random number of a high quality can be obtained, security is in danger. However, testing or monitoring the true random number generating circuit is a large load for a system in operation. For such a technical problem, the true random number generating circuit of the present invention can solve these problems with the aforementioned simple configuration.

Figure 19:
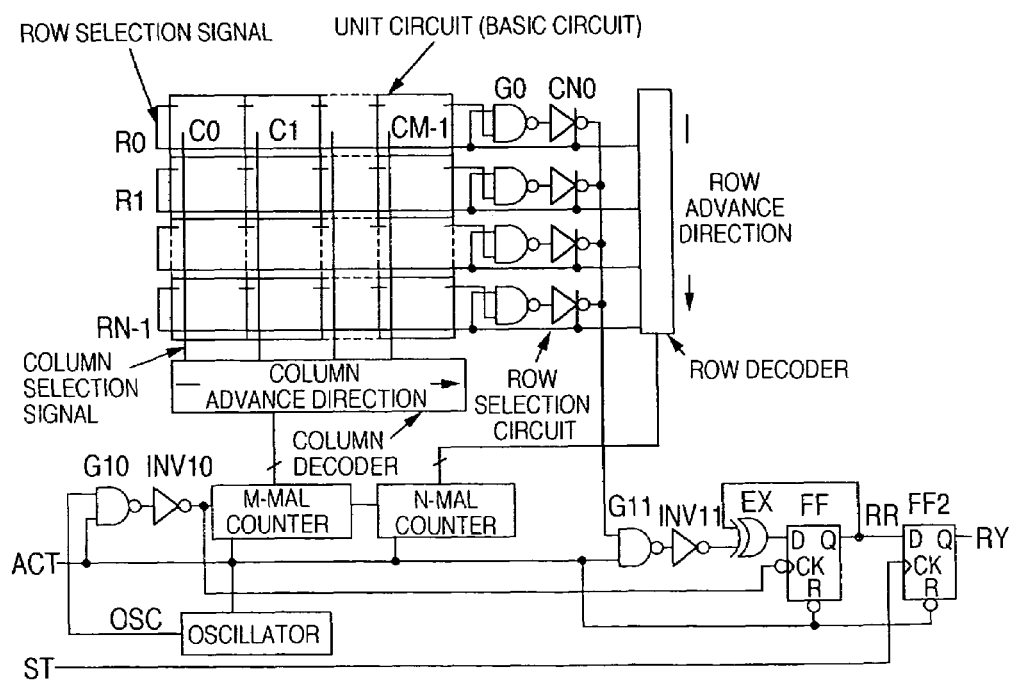
FIG. 19 shows a circuit diagram of a true random number generating circuit according to an embodiment of the present invention.

FIG. 19 shows a circuit diagram of a true random number generating circuit according to an embodiment of the present invention. This embodiment has a basic configuration identical to the embodiment of FIG. 9. In this embodiment, an oscillation pulse formed by an oscillator is used as the clock.

Figure 20:
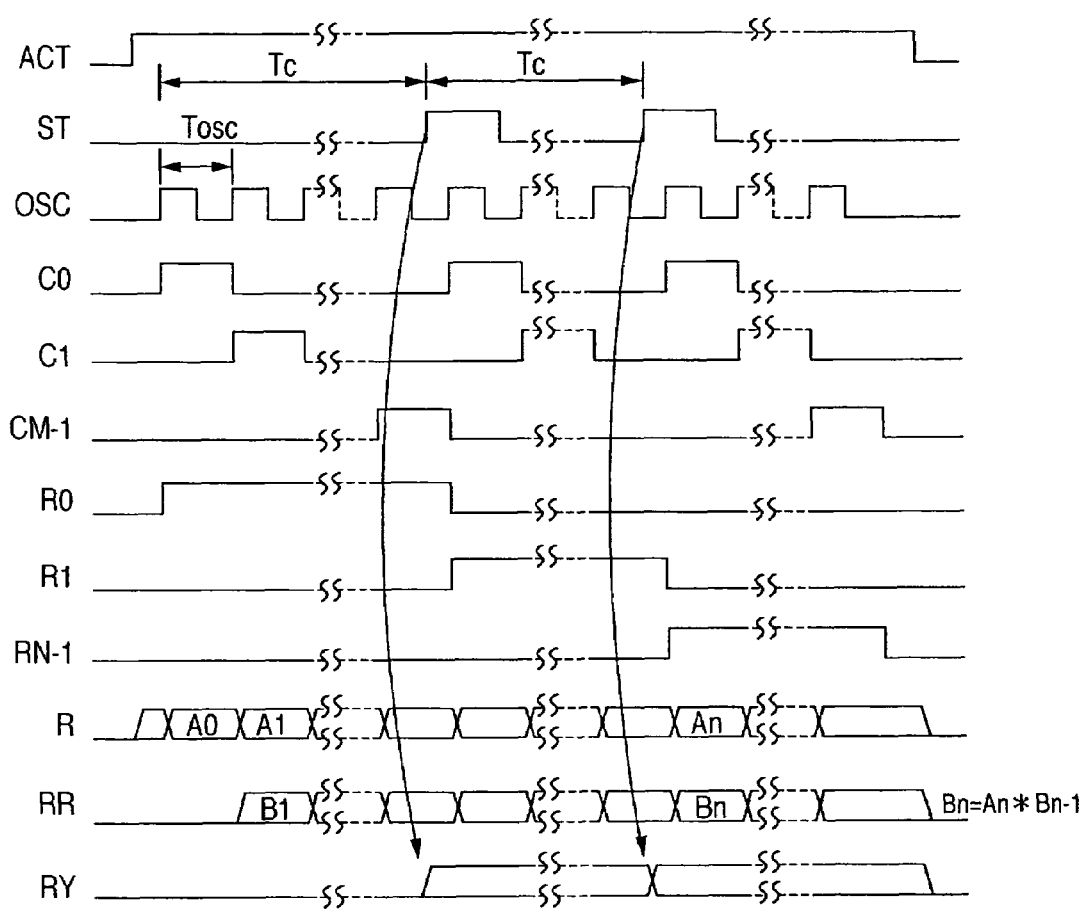
FIG. 20 shows an operation waveform diagram of the true random number generating circuit in FIG. 19.

FIG. 20 shows an operation waveform diagram of the true random number generating circuit of FIG. 19. The activation signal ACT causes the oscillator to generate a pulse of a particular cycle Tosc. Upon reception of the pulse OSC, the unit circuits in the unit circuit group are successively selected and a random number is generated in the RR signal. When the start signal ST is shifted to the high level, the random number of the RR signal is extracted from the output RY. The relationship between the cycle Tc of the start signal and the cycle Tosc of the oscillator is $[Tc] \geq [Tosc] \times [n]$ since output signals should be read from all the unit circuits. Here, [n] represents the number of units circuits (M×N) in the unit circuit group. The oscillator output pulse OSC may be a system clock of the LSI on which the true random number generating circuit is mounted.

Figure 21:
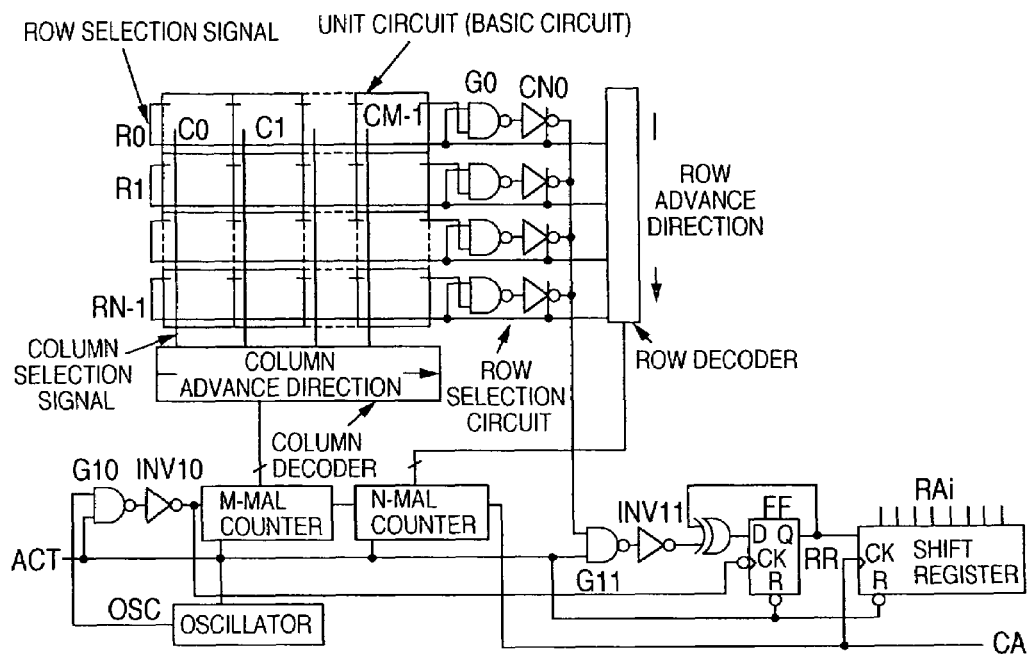
FIG. 21 shows a circuit diagram of a true random number generating circuit according to an embodiment of the present invention.

FIG. 21 shows a circuit diagram of a true random number generating circuit according to an embodiment of the present invention. This embodiment has basic configuration identical to the embodiment of FIG. 19. In this embodiment, the start signal ST is omitted and the operation state is set in by the operation control signal ACT. A shift register is arranged immediately before the output so as to generate a random number RAi formed by parallel bits.

Figure 22:
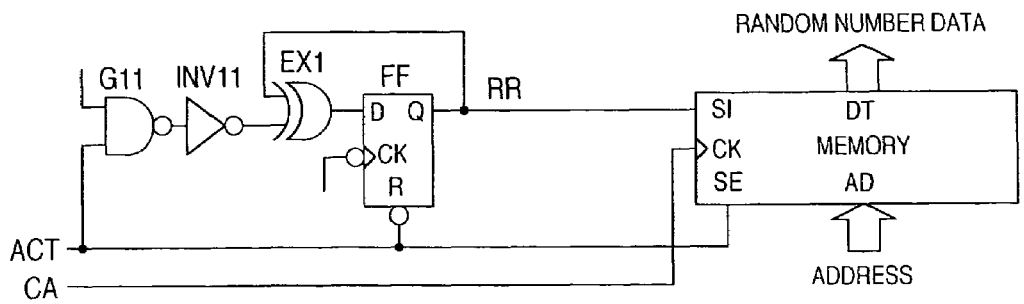
FIG. 22 shows a circuit diagram of an output unit of a true random number generating circuit according to another embodiment of the present invention.

FIG. 22 shows an output unit of a random number generating circuit according to another embodiment of the present invention. In this embodiment the shift register in FIG. 21 is replaced by a memory. The memory used in the figure is a so-called serial input/parallel output type memory. When the control signal ACT is at the high level, the true random number generating circuit generates a 1-bit true random number from RR for each clock M×N cycle. Simultaneously with this, the memory is a serial input mode and acquires a true random number from the input SI and accumulates it. When the control signal is at the low level, the true random number generating circuit stops and the memory is in parallel output mode, when the true random number accumulated in the memory space corresponding to the input AD address information is outputted from the output DT. It should be noted that the meanings of the input and the output of the memory are as follows. SE is a control input for switching the mode of the memory. When high level, the mode is serial input mode. When low level, the mode is parallel input mode. SI is a serial data input. CK is a synchronization signal input for acquiring a serial input. AD is an address input for selecting the memory space when the mode is parallel output mode. DT is a parallel data output.

The memories shown in FIG. 22 may be FIFO (First In First Out) type memories or asynchronous memories capable of simultaneously performing the serial input and the parallel input.

Figure 23:
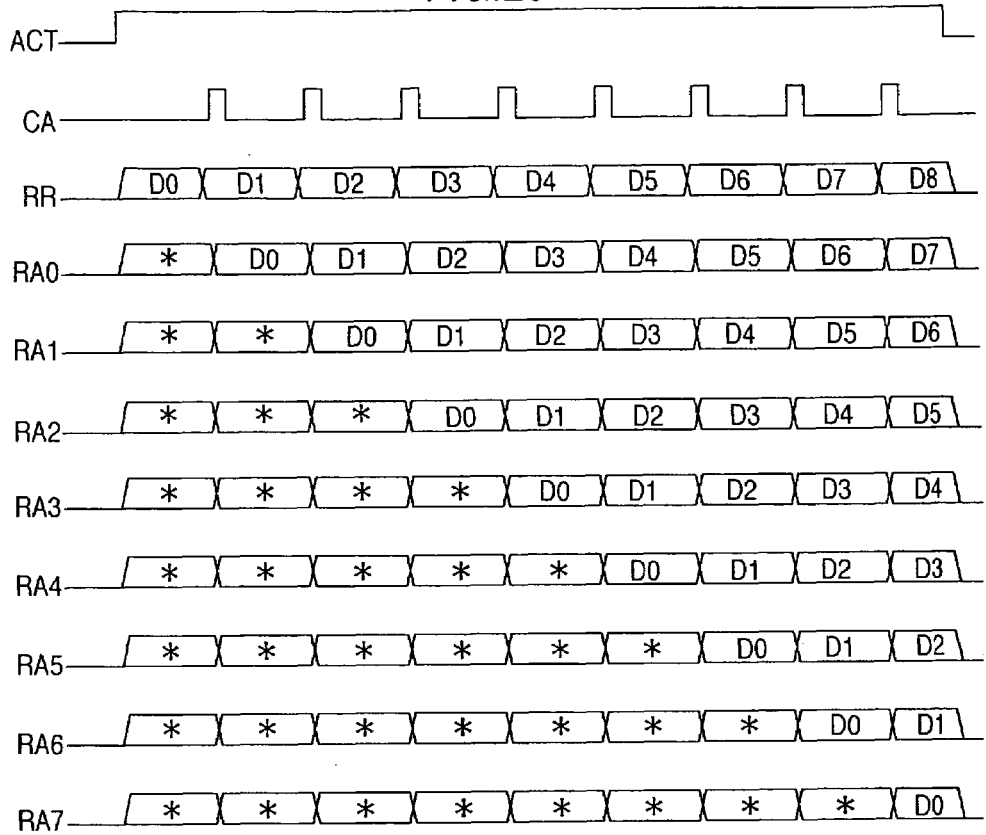
FIG. 23 shows an operation waveform diagram of the true random number generating circuit shown in FIG. 21.

FIG. 23 shows an operation waveform diagram of the true random number generating circuit shown in FIG. 21. The operation control signal ACT causes the circuit to enter the operation state. By the carry signal CA of the N-mal counter, the shift register performs 1-bit shift operation and acquires the generated true random number RR. In this embodiment, the unit circuit group consisting of 0 to 7 is read out and 8-bit random numbers D0 to D7 can be outputted in parallel.

Figure 24:
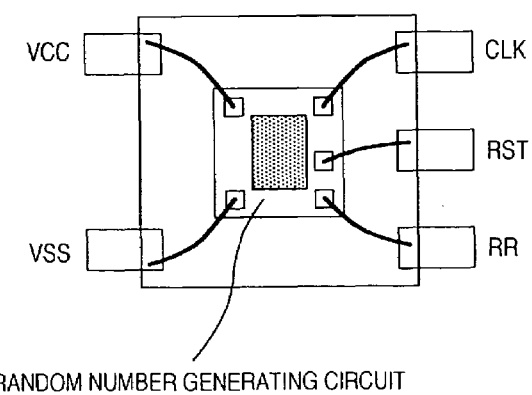
FIG. 24 shows a chip configuration of a true random number generating circuit according to an embodiment of the present invention.

FIG. 24 shows a chip configuration of the true random number generating circuit according to an embodiment of the present invention. In this embodiment, the true random number generating circuit is configured by a single IC. The IC has power terminals VCC, VSS a clock input terminal CLK, an operation control signal terminal RST, and a true random number output terminal RR as external terminals. In the aforementioned case having the oscillator, the clock terminal CLK is omitted. Moreover, the IC having a test circuit includes a judgment output terminal, a test mode input terminal, and the like. The judgment output terminal can be shared (?) by the random number output terminal RR. The IC chip may be sealed in one packet or mounted on the same substrate of another IC and sealed (multi-chip IC), or can be directly mounted on the system.

Figure 25:
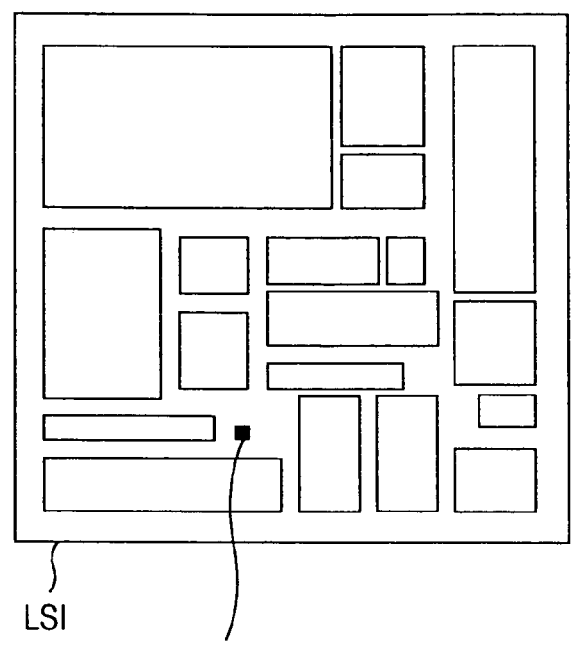
FIG. 25 shows a block diagram of a semiconductor integrated circuit device according to an embodiment of the present invention.

FIG. 25 is a block diagram of a semiconductor integrated circuit device according to an embodiment of the present invention. The respective circuit blocks in this embodiment are drawn in accordance with the geometrical circuit arrangement on the actual semiconductor substrate. In the semiconductor integrated circuit device, a combination of a plurality of circuit blocks has a particular signal processing function. The true random number generating circuit is mounted on the semiconductor integrated circuit device having such circuit blocks. The clock required for the true random number generating circuit may be the clock formed by the clock generating circuit arranged on the semiconductor integrated circuit device or the clock supplied from an external terminal. Moreover, in the random number generating circuits of FIG. 19 and FIG. 21 having an oscillator, the clock supply is not required.

Figure 26:
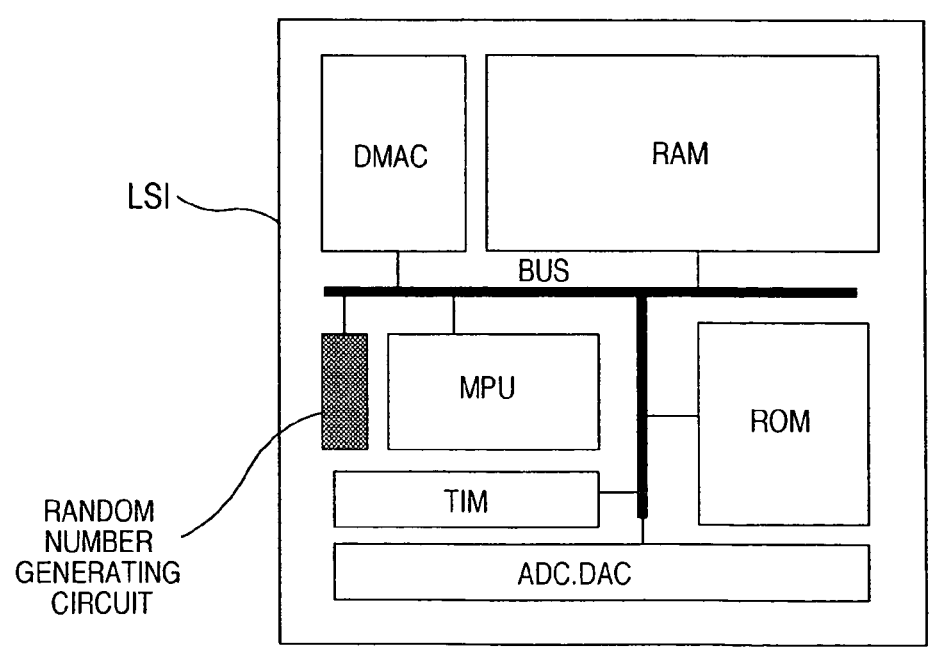
FIG. 26 shows a block diagram of a semiconductor integrated circuit device according to another embodiment of the present invention.

FIG. 26 is a block diagram of a semiconductor integrated circuit device according to another embodiment of the present invention. In this embodiment also, the respective circuit blocks are drawn in accordance with the geometrical circuit arrangement on the actual semiconductor substrate. This embodiment is intended for a one-chip microcomputer having an MPU (micro-processing unit) at the center. This microcomputer has BUS (address bus, data bus, and control bus) connected to the MPU, a RAM (random access memory), a ROM (read only memory), a DMAC (direct memory access controller), a TIM (timer), an ADC (analog/digital converter), a DAC (digital/analog converter), and the aforementioned true random number generating circuit.

The true random number generating circuit of the present invention can be realized all by the standard CMOS logic circuits. This reduces the load required for a complicated analog circuit design or LSI mounting, reduces the product cost, and improves the reliability. Moreover, it is possible to provide a module strong against cracking which is the biggest problem in the security. This is because only the standard logic circuits are used and it is possible to obtain a stealth effect to avert an attack target in the LSI. That is, there is no circuit pattern characteristic like when an analog circuit is used. Besides, when a random number is extracted via the bus in like in the aforementioned case, the stealth effect is further enhanced.

Figure 27:
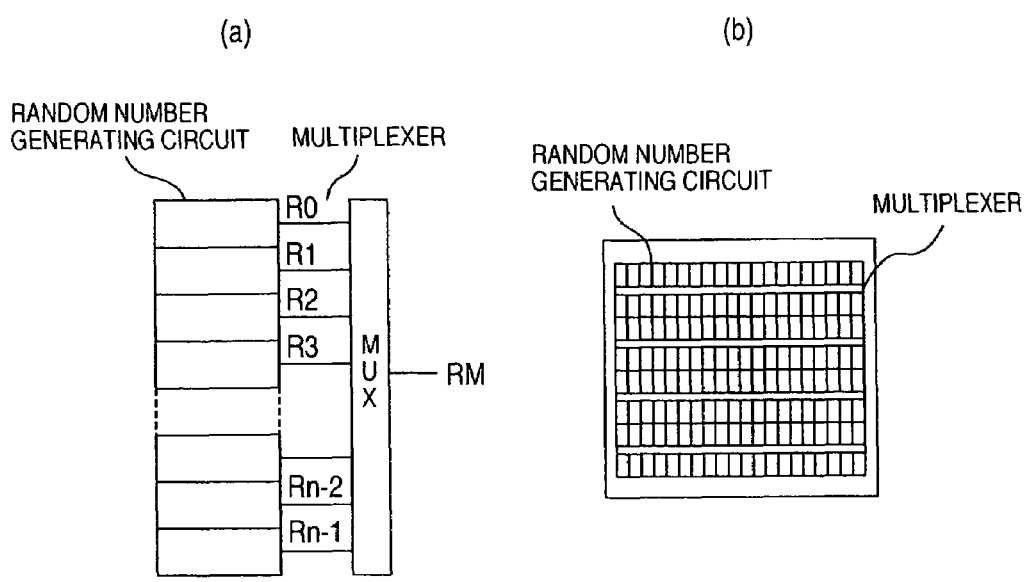
FIG. 27 shows a configuration of a true random number generating circuit according to another embodiment of the present invention.

FIG. 27 shows a configuration of the true random number generating circuit according to an embodiment of the present invention. FIG. 28(a) shows a circuit block configuration and FIG. 27(b) shows a layout configuration. In this embodiment, n pieces of true random number generating circuits shown in FIG. 7, for example, are arranged. That is, n true random number generating circuits 0 to n−1 are arranged and the respective output signals R0, R1 to Rn−1 pass through a multiplexer MUX so that one signal is selected to output a true random number RM.

As shown in the layout configuration of FIG. 27(b), a multiplexer is sandwiched two true random number generating circuits, which enables effective circuit arrangement. In this figure, one circuit block in the true random number generating circuit represents, for example, one of the aforementioned unit circuits. In this configuration, the multiplexer sandwiched by two true random number generating circuits may have a comparatively simple configuration for selecting one of two. Accordingly, at the portion where the multiplexer is arranged, a selection signal generating circuit such as the decoder is arranged.

For example, when a random number R is obtained by n unit circuits in the true random number generating circuit of this embodiment, a 1-bit random number R requires output signals from all the unit circuits and spends n cycles. When n random number generating circuits are provided like in this embodiment in accordance with the n cycles required for obtaining the one random number, it is possible to generate a random number with a high frequency synchronized with the clock CLK. However, this requires n dummy cycles counted from the start of operation by the operation control signal.

Figure 28:
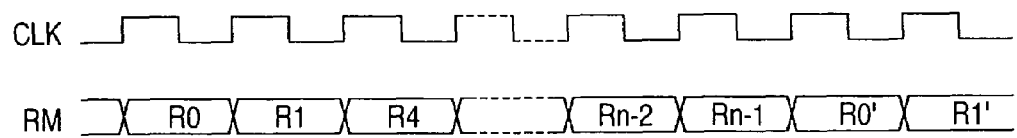
FIG. 28 shows a timing diagram showing operation of the true random number generating circuit shown in FIG. 27.

FIG. 28 is a timing diagram showing an example of operation of the true random number generating circuit shown in FIG. 27. In the true random number generating circuit of FIG. 27, in order to read out the first random number generating circuit, random numbers R0 to Rn−1 are outputted from the respective true random number generating circuit after n cycles (n clocks). Accordingly, by selecting one after another in synchronization with the clock CLK by the multiplexer MPX, it is possible to obtain a true random number RM (R0, R1, R2 . . . Rn−1, R0', R1', R2' . . . ) of high bit rate synchronized with the clock CLK.

Figure 29:
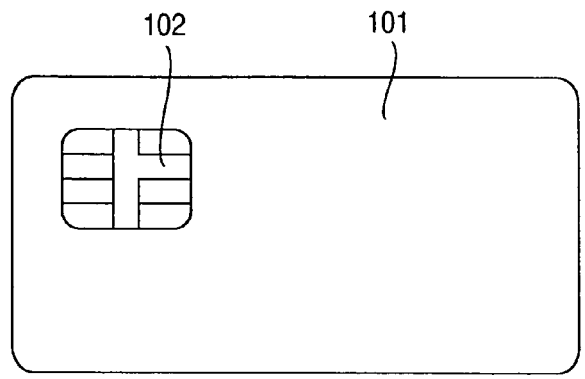
FIG. 29 is an external view of an IC card according to an embodiment of the present invention.

FIG. 29 shows an external view of an IC card according to an embodiment of the present invention. The IC card includes a card 101 formed by a plastic case and an IC card chip formed by a 1-chip microcomputer or the like (not depicted) mounted in the card 101. The IC card also has a plurality of contacts (electrodes) 102 connected to an external terminal of the IC card chip.

The plurality of contacts 102 are a power terminal VCC, a power reference potential terminal VSS, a reset input terminal RES bar, a clock terminal CLK, a data terminal I/O-1/IRQ bar, an I/O-2/IRQ bar which will be detailed with reference to FIG. 30. The IC card receives power from an externally connected device such as a reader/writer (not depicted) via the contacts 102 and performs data communication with the externally connected device.

Figure 30:
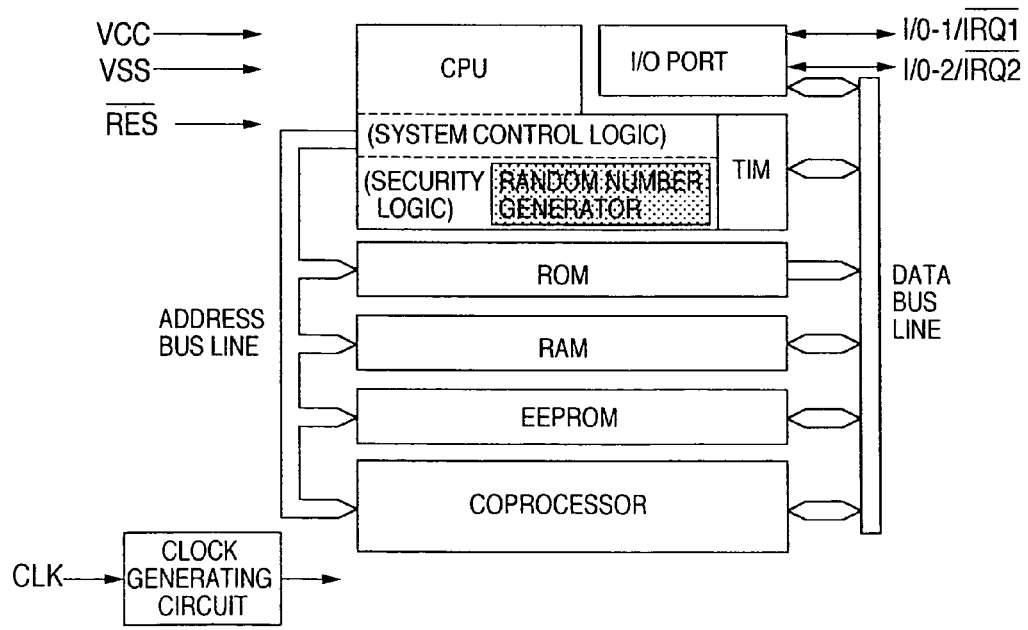
FIG. 30 shows a brief block diagram of an IC card chip mounted on an IC card according to an embodiment of the present invention.

FIG. 30 is brief block diagram of the IC card chip (microcomputer) mounted on the IC card according to an embodiment of the present invention. The circuit blocks in FIG. 30 are formed on a single semiconductor substrate such as monocrystal silicon.

The IC card chip according to the present invention has basically identical configuration as a microcomputer. The chip is basically formed by a clock generating circuit, a central processing unit (hereinafter, simply referred to as CPU), a ROM (Read Only Memory), a RAM (Random Access Memory), a nonvolatile memory (EEPROM), and other memories, a coprocessor (encryption/decryption device) for performing encryption and decryption, and an I/O port.

The clock generating circuit receives an external clock CLK supplied via the contacts 102 in FIG. 29 from a reader/writer (externally connected device) (not depicted), forms a system clock signal synchronized with the external clock signal, and supplies it inside the chip.

The CPU performs logic operation and arithmetic calculation and controls the system control logic, the random number generator, the security logic, and the timer. The memories such as the RAM, the ROM, and the EEPROM store programs and data. The coprocessor is formed by a circuit compatible with the DES encryption method and the like. The I/O port performs communication with the reader/writer. The data bus and the address bus connect the respective components.

Among the aforementioned memories, the ROM is a memory in which the stored content is fixed in the nonvolatile way and which is mainly used for storing programs. A volatile memory (hereinafter, referred to as a RAM) is a memory in which stored information can be freely rewritten and the stored content disappears when power supply is interrupted. When the IC card is pulled out of the reader/writer, the power supply is interrupted and the contents of the RAM cannot be held.

The nonvolatile memory (hereinafter, referred to EEPROM (Electrical Erasable Programmable Read Only Memory)) is a memory in which the content can be rewritten. The information written there is held even when power supply is interrupted. The EEPROM is used for storing data which need be rewritten and held when the IC card is pulled out of the reader/writer. For example, when the IC card is used as a prepaid card, the number of prepaid times is rewritten each time the card is used. In this case, the number of prepaid times should be held even after the IC card is pulled out of the reader/writer and is held in the EEPROM.

The CPU has configuration identical to that of a so-called microprocessor. That is, although the details are not depicted, the CPU includes a command register, a micro command ROM for decoding a command written in the command register and forming various micro commands or control signals, operation circuits, general-purpose registers (RG6 and the like), a bus driver connected to the internal BUS, and an I/O circuit such as a bus receiver. The CPU reads out a command stored in the ROM or the like and performs operation corresponding to the command. The CPU performs control for acquisition of external data inputted via the I/O port, read out of a command from the ROM and data such as fixed data required for executing the command, write and read of data to/from the RAM an the EEPROM.

The CPU receives a system clock signal generated from the clock generating circuit and operates at the operation timing and cycle decided by the system clock signal. The CPU has the main internal portion including CMOS circuits formed by P-channel MOSFET and N-channel MOSFET. For example, the CPU includes a CMOS static circuit capable of performing static operation such as a CMOS static flip-flop and a CMOS dynamic circuit capable of performing precharge to the signal output node and signal output to the signal output node in synchronization with the system clock signal.

The coprocessor adds a sign bit to the plain text data handled inside so as to have both of positive/negative states. During the repeated calculation in encryption, the data is modified at random for each sign. Calculation not affected by the sign (such as exclusive OR) is performed as it is while ignoring the sign. In calculation affected by the sign (such as calculation using a conversion table), a calculation circuit for the positive state and a calculation circuit for the negative state are prepared and the output of the calculation circuits is selected according to the data sign.

The DES (Data Encryption Standard) is a secret key block encryption used widely. The DES algorithm can be roughly divided into a plain text data flow and a key data flow. In the plain text data flow, a transportation (signal replacement) called IP is performed and then the data is divided into upper 32 bits and lower 32 bits. The transportation/character conversion process is repeated 16 times. At last, the upper 32 bits and the lower 32 bits are unified and transportation called $IP^{-1}$ is performed to obtain an encrypted text.

In the DES, encryption and decryption can be realized by the same process. However, the key scheduling is different between encryption and decryption. Details of the key scheduling are omitted. According to the key data, 48-bit key scheduling data is outputted for each stage.

In the DES algorithm, the same internal operation is always performed for the same plain text. As a result, the internal signal varies depending on the input signal and it is possible to easily perform the statistical process by the DPA (Differential Power Analysis). That is, in the DPA method, the encryption key is estimated by statistically processing the consumed current waveform. For example, an encryption key assumed is applied to a certain part of the DES and the consumed current waveform is measured and statistically processed while changing the plain text. This work is repeated while changing the encryption key. When a correct key is applied, the current waveform shows a large peak.

As a countermeasure for DES decryption by the aforementioned DPA, there is JP-A-2000-066585. According to the technique disclosed in this document, a pair of a pattern of a mask "a" and a mask pattern of the inversion bit is provided so that one of them is selected at random by a switch each time encryption is performed, thereby masking the bit depending on the plain text in the device so as to remove the affect of the mask "a" from the encrypted text before being outputted.

It is explained that the aforementioned mask should not be a particular pattern in order to prevent decryption by the DPA. A random number generated by a random number generator is used so that a pattern of a plural bits is not a particular pattern.

Figure 31:
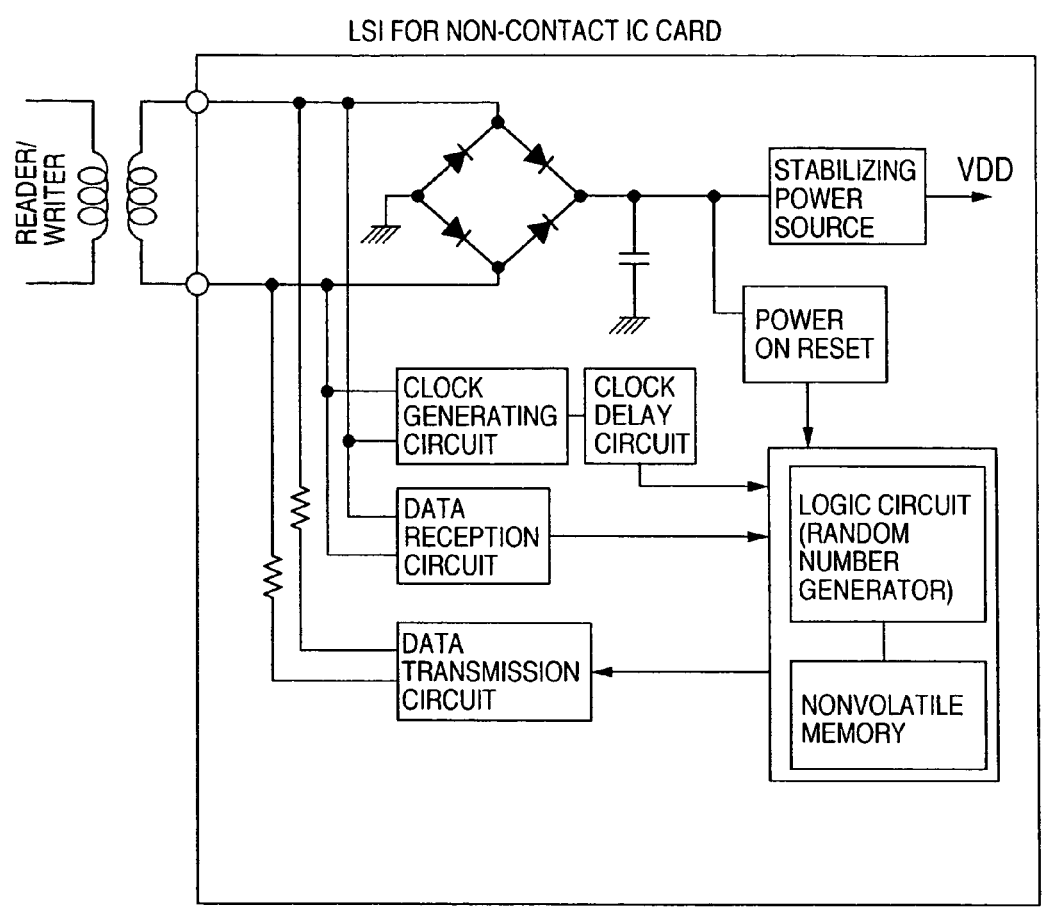
FIG. 31 shows a block diagram of a non-contact IC card according to an embodiment of the present invention.

FIG. 31 shows a block diagram of a non-contact IC card according to an embodiment of the present invention. FIG. 31 also shows a coil (antenna) of a reader/writer provided as an external device for the non-contact IC card. The LSI mounted on the non-contact IC card includes the blocks depicted and function blocks such as a memory and a microcomputer, which are expressed as a logic circuit and a nonvolatile memory. The circuit elements constituting the respective blocks of the LSI may be, for example, formed on a single semiconductor substrate like a monocrystal silicon by the MOSFET (metal oxide semiconductor field effect transistor) integrated circuit fabrication technique. In this Description, the term MOSFET is used as a general name for insulation gate type field effect transistors. Moreover, the LSI is laminated by a predetermined protection film and then mounted on a card surface as a substrate of the non-contact IC card, which is further covered by a film.

The non-contact IC card of the present embodiment may be, for example, a so-called adhesion type non-contact IC card including a coil-shaped electricity-receiving coil (card side antenna) formed on a card surface by using a copper foil, for example, and an LSI connected to the electricity-receiving coil via a predetermined wiring layer. The LSI is formed by a rectifier circuit including four diodes bridged, a smoothing capacitor for smoothing the rectified voltage of the rectifier circuit, and a stabilizing power supply circuit, which form an operation voltage VDD of the internal circuit including the aforementioned logic circuit and the nonvolatile memory. For the rectifier circuit, a clock generating circuit, a data receiving circuit, and a data transmitting circuit are provided substantially in a parallel form.

The rectifier circuit formed by the diode bridge circuit rectifies an AC signal, i.e., a carrier transmitted as power to the electricity receiving coil of the non-contact IC card by the electromagnetic coupling with a transmission coil (antenna) of the reader/writer, generates DC power voltage VDD from voltage smoothed by the smoothing capacitor by the stabilizing power supply, and supplies it as power to the respective function blocks of the LSI. A power-ON reset circuit detects a rise of the power voltage VDD, i.e., detects the connection with the reader/writer and resets the logic circuit register and latch circuit so as to normally perform data reception and transmission.

The data receiving circuit receives and demodulates data transmitted, for example, by frequency-modulating the carrier and transmits it as internal input data to the internal circuit of the LSI. The output data formed in the internal circuit frequency-modulates the carrier by the data transmission circuit and transmits it to the reader/writer.

The aforementioned internal circuit (logic circuit), the data receiving circuit, and the data transmitting circuit requires a clock signal for the operation sequence control and signal reception and transmission in addition to the aforementioned operation voltage VDD. In this embodiment, the clock generating circuit generates a clock signal by using the AC signal as a pulse signal. The logic circuit unit includes a random number generator, which is used for data transmission and reception to/from outside.

In the aforementioned non-contact IC card, the DC power voltage VDD has a small current supply capacity and the power consumption by the random number generator also should be small. The aforementioned random number generating circuit successively operates the unit circuits and power consumption can be made small. Accordingly, the random number generator of this embodiment is appropriately mounted on the aforementioned non-contact IC.

Figure 32:
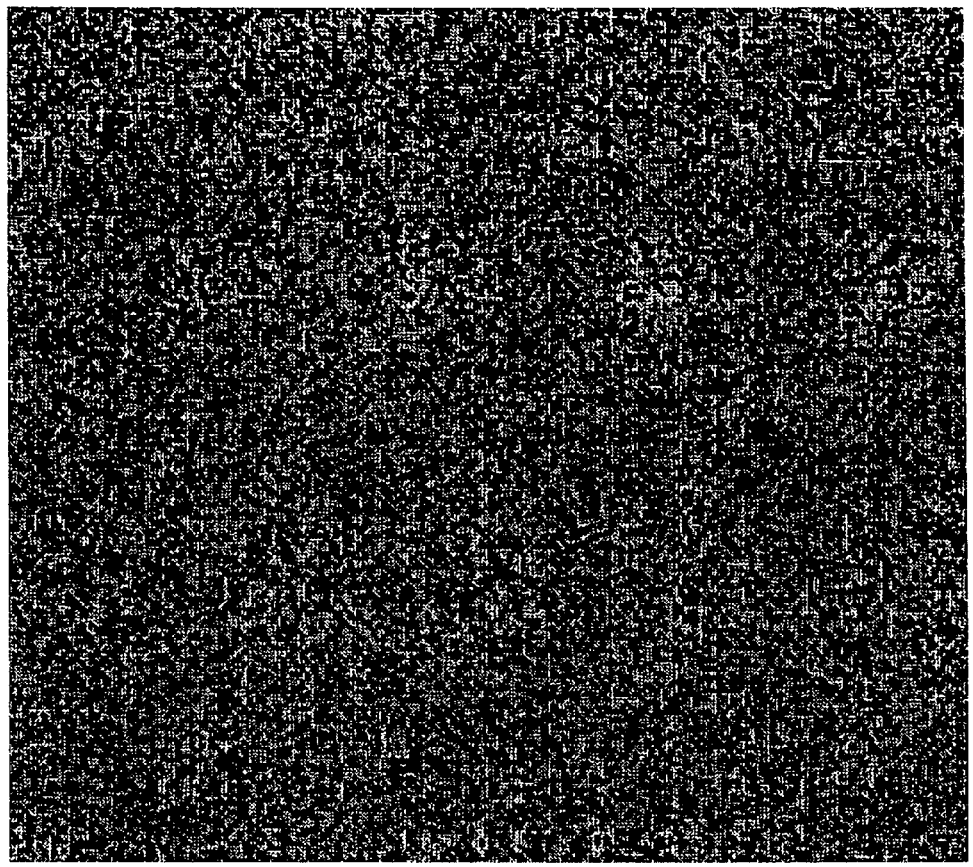
FIG. 32 shows a two-dimensional distribution diagram of true random numbers generated by the true random number generating circuit according to the present invention.

FIG. 32 shows random number two-dimensional dispersion diagram of a random number generated by the random number generating circuit according to the present invention. In FIG. 32, 0 and 1 of 200×200-bit random number are expressed corresponding white dots and black dots. In this embodiment, 128 unit circuits (basic circuits) are used to constitute a circuit by a normal CMOS process.

FIG. 32 shows a random number two-dimensional dispersion diagram read by a scanner with 400 dpi and is slightly different from the actual random number two-dimensional dispersion diagram. However, FIG. 32 roughly shows the random number two-dimensional dispersion, which shows that no particular pattern exists. That is, the random number has a high quality. Moreover, the result of the random number inspection by the aforementioned FIPS 140-2 is as follows. The length of the random number used at one inspection is 20,000 bits and this is repeated 600 times. The inspection results were all satisfactory.

Nowadays, security has become a daily topic. This is probably because of the wide spread of the Internet. The Internet is a network technique for connecting devices apart far from each other. Since the data coming and going via the Internet passes through computers and network devices of a third person and there is always a danger of wiretap and tampering. In order to make the Internet a safe infra in which security and privacy are guaranteed, encryption and authentication are in the spotlight. Currently, various security techniques are used in the Internet such as SSL (Secure Socket Layer) and IPsec (Internet Protocol security) techniques. These techniques require random numbers of a high quality although the details are not described here. Especially, the IPsec is employed as an indispensable condition in the IPv6 (Internet Protocol Version 6) which is the Internet technique of the next generation. When the IPv6 is spread, an IP number can be assigned to a personal computer and a mobile telephone as well as an automobile of home electric appliance. In this case, it is necessary to easily generate a random number of high quality, i.e., a true random number in the devices.

As has been described above, the true random number generating circuit according to the present inventions is entirely realized only by the standard CMOS logic circuits. This reduces the load required for a complicated analog circuit design and LSI mounting and contributes to reduction of the cost and improvement of reliability.

Figure 34:
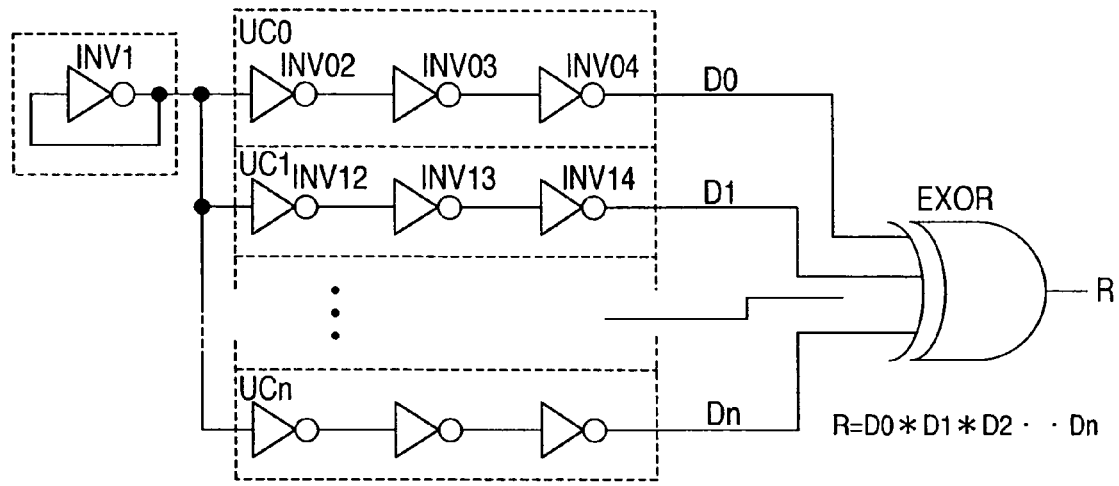
FIG. 34 shows a circuit diagram of a modified example of the basic concept of the true random number generating circuit shown in FIG. 1.

FIG. 34 shows a circuit diagram of an application concept of the basic concept of the true random number generating circuit shown in FIG. 1 and mounted on the semiconductor integrated circuit device according to the present invention. In FIG. 1, a true random number is based on the electric signal noise generated in the INV1 and INV2 in each of the basic circuits. However, in FIG. 34, the first inverter INV1 is shared and the second inverter is spread to the respective basic circuits. That is, when there exists a combination having a quite small difference between the logic threshold value VLT1 of the first inverter of only one type and the logic threshold value VLT2 of the second inverter in the respective basic circuits, it is possible to obtain a true random number reflecting the affect of the electric signal noise of the first inverter and the second inverter. It should be noted that operation of the third inverter and after is identical to the content explained with reference to FIG. 1 and is omitted.

Figure 35:
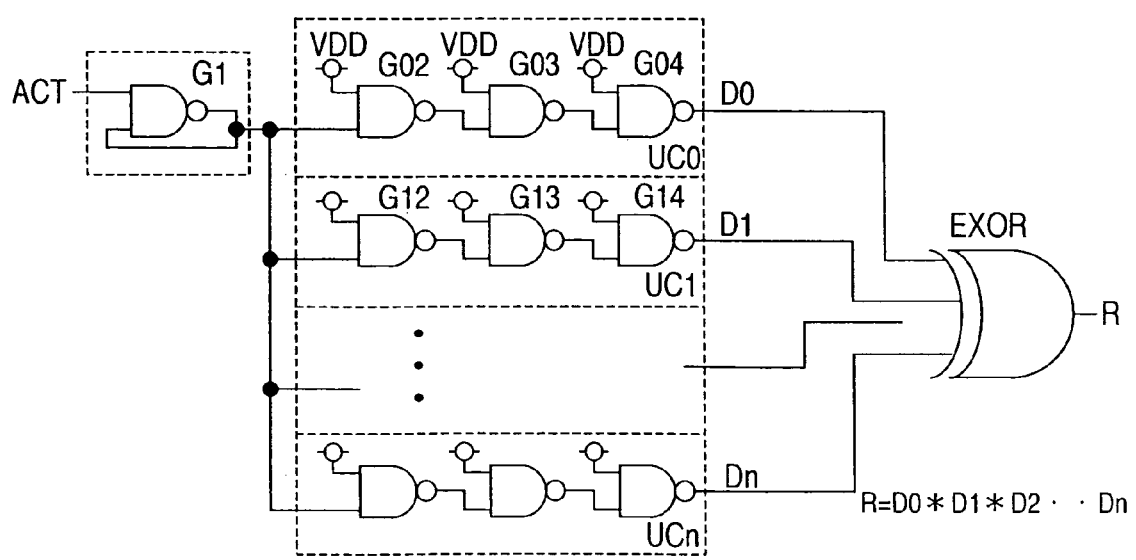
FIG. 35 shows a circuit diagram of another modified example of the basic concept of the true random number generating circuit shown in FIG. 1.

FIG. 35 shows a circuit diagram of another application concept of the applied basic concept of the true random number generating circuit shown in FIG. 34 and mounted on the semiconductor integrated circuit device according to the present invention. In this embodiment, the inverter circuits INV1 to INV14 of FIG. 34 are replaced by 2-input NAND gate circuits G1 to G14. The gate circuit G1 has one input and the output coupled with each other. The shared input/output of the gate circuit G1 is connected to one input of the gate circuit G02 in the basic circuit. The output of the gate circuit G02 is connected to one of the inputs of the gate circuit G03. The output of the gate circuit G03 is connected to one of the inputs of the gate circuit G04. The other inputs of these gate circuits G02 to G04 are connected to a power source VDD and always at high level (logical 1).

The inverter circuits INV1 to INV14 in FIG. 34 can be considered as a type of the logic gate circuit such as the NAND gate circuits G1 to G14. This is because the logical operation for inverting the input signal is performed. When the inverter circuits INV1 to INV14 are used like in FIG. 34, the inverter circuits INV1 and INV02 operate in the vicinity of the logical threshold value voltage VLT at the initial stage side and DC current flows between the power voltage VDD and the circuit ground potential. The present invention utilizes the normal distribution of the logical threshold value voltage by the element process irregularities as has been described above. For this, a comparatively large number of unit circuits should be operated. Accordingly, the DC current in the inverter circuits INV1 and INV02 cannot be ignored when reduction of power consumption is required.

On the other hand, when the gate circuits G1 to G14 are used like in this embodiment, the gate circuits G1 to G14 operate as follows. When the operation control signal ACT is set to inactive level such as low level (logical 0), the output of the gate circuit G1 unconditionally becomes high level (logical 1). For example, the output of the gate circuit G02 inputting the output of the gate circuit G1 unconditionally becomes low level (logical 0). The output of the gate circuit G03 inputting the output of the gate circuit G02 unconditionally becomes high level (logical 1). The output of the gate circuit G04 inputting the output of the gate circuit G03 unconditionally becomes high level (logical 1). Thus, no DC current is generated in the respective gate circuits G1, G02, G03, G04 and other basic circuits equivalent to them. That is, in the circuit of this embodiment, the operation control signal ACT is set to active level such as high level (logical 1) at the timing when a random number is required. Accordingly, the respective gate circuits G1 to G14 perform operation as the inverter circuits for forming an inverted signal in response to the input signal different from the operation control signal ACT. This sets the operation control signal ACT to high level to perform the operation identical to the basic circuit diagram of FIG. 34.

The invention made by the inventor has been explained through specific embodiments. However, the present invention is not to be limited to the embodiments and can be modified without departing from the spirit of the invention. For example, when the resistance elements are made load elements for the signal input MOSFET constituting the invert and the gate circuit, the information based on the characteristic irregularities reflect both of the characteristic irregularities of the resistance elements and the characteristic irregularities of the signal input MOSFET. Specific information corresponding to the resistance irregularities need not be formed only in the semiconductor integrated circuit device but can have configuration of connection via an external terminal. However, in order to reduce the power consumption, use of the aforementioned CMOS gate circuits is preferable. Moreover, the first inverter circuit INV1 and the second inverter circuit INV2 may be replaced by the clocked inverter circuit CN as shown in FIG. 10(b) so that activation is performed by the operation control signal.

INDUSTRIAL APPLICABILITY

The present invention may be widely applied to the random number generating method and the semiconductor integrated circuit device for generating a random number to be used in a network device, a radio communication device, an encryption/decryption device, an authentication system, or "an individuality factor" and "a fancy factor" of a toy robot and a game character.

The invention claimed is:

1. A random number generating method in an electronic device using a random number, the method comprising:
providing an electronic device including a plurality of unit circuits each having a corresponding noise source, including a first logic circuit and a second logic circuit, each logic circuit having a same shape and each being formed through a same fabrication process on a substrate of semiconductor material, and an amplifier circuit to which an output of the corresponding noise source is supplied, the electronic device also including a signal variation detector circuit to which outputs from said plurality of unit circuits are supplied;

causing said plurality of unit circuits and said signal variation detector circuit to perform operations including:

generating a binary signal at each unit circuit by amplifying noise superposed on a differential voltage of threshold voltages of the first and the second logic circuits of the respective unit circuit;

generating, with said signal variation detecting circuit, an output signal in response to a variation in any of the binary signals outputted from the respective unit circuits; and combining a plurality of the binary signals outputted from the signal variation detecting circuit to generate a random number.

2. The random number generating method as claimed in claim 1, wherein, in each respective unit circuit, said first and second logic circuits are formed with logic gate circuits each having a first and a second input, respectively, the logic gate circuit in the first logic circuit being configured to have its output connected to its first input, the logic gate circuit in the second logic circuit being configured to have its first input connected to an output of the logic gate circuit in the first logic circuit, wherein the amplifier circuit includes a plurality of logic gate circuits each having a first input and a second input, said plurality of logic gate circuits being connected in series so that an output of a logic gate circuit is connected to the first input of a next logic gate circuit in the series, and wherein, when an operation control signal is supplied to the second inputs of the logic gate circuits, respectively said plurality of unit circuits are caused to generate the random number via the signal variation detecting circuit.

3. The random number generating method as claimed in claim 2, wherein said electronic device is further provided with an order circuit configured to generate the operation control signal, wherein the plurality of unit circuits are successively selected in response to said operation control signal generated by said order circuit and output signals from all of the unit circuits are outputted serially so as to generate a 1-bit random number by the signal variation detecting circuit.

4. The random number generating method as claimed in claim 3, wherein the signal variation detecting circuit includes an exclusive logic circuit and is configured to generate the random number by serially receiving output signals from the respective unit circuits successively selected correspondingly to the operation control signal supplied by the order circuit.

5. The random number generating method as claimed in claim 3, further generating an identification signal unique to a semiconductor chip or an integrated circuit on which said unit circuits are formed by a combination of the output signals from all of the unit circuits corresponding to the 1-bit random number.

6. The random number generating method as claimed in claim 1, wherein said electronic device is further provided with an arithmetical random number generating circuit configured to generate an arithmetical random number, wherein the random number generating method further comprises:

supplying the random number generated by the signal variation detecting circuit to said arithmetical random number generating circuit; and causing said arithmetical random number generating circuit to generate the arithmetical random number using the random number supplied from the signal variation detecting circuit as an initial value of the arithmetical random number to be generated by the arithmetical random number generating circuit.

7. A random number generating method in an electronic device using a random number, the method comprising:

providing an electronic device including a plurality of unit circuits each having a corresponding noise source including a first logic circuit and a second logic circuit, each logic circuit having a same shape and each being formed through a same fabrication process on a substrate of semiconductor material, and an amplifier circuit to which an output of the corresponding noise source is supplied, the electronic device also including a signal variation detector circuit to which outputs from said plurality of unit circuits are supplied and an arithmetical random number generating circuit configured to generate an arithmetical random number; and causing said plurality of unit circuits and signal variation detector circuit to perform operations including:

generating a binary signal at each unit circuit by amplifying noise superposed on a differential voltage of threshold voltages of the first and the second logic circuits of each respective unit circuit;

generating, at said signal variation detecting circuit, an output signal in response to a variation in any of the binary signals outputted from the respective unit circuits; and combining a plurality of the binary signals outputted from the signal variation detecting circuit to generate a random number;

supplying the random number generated by the signal variation detecting circuit to said arithmetical random number generating circuit; and causing said arithmetical random number generating circuit to generate the arithmetical random number using the random number supplied from the signal variation detecting circuits as an initial value of the arithmetical random number to be generated by the arithmetical random number generating circuit.

8. A semiconductor integrated circuit device comprising: a plurality of unit circuits each having a first and a second logic circuit formed into an identical shape through an identical fabrication process and an amplifier circuit for forming a binary signal by amplifying a noise superposed on the differential voltage of threshold voltages of the first and the second logic circuits; and a signal variation detecting circuit for forming an output signal in response to a variation in any of a plurality of binary signals outputted from the plurality of unit circuits, wherein a random number is generated from a binary signal outputted from the signal variation detecting circuit.

9. A semiconductor integrated circuit device formed with a random number generating member configured to supply a random number to an application specific function of the semiconductor integrated circuit device, said random number generating member comprising:

a plurality of unit circuits each having a corresponding noise source including a first logic circuit and a second logic circuit, each logic circuit having a same configuration and each being formed through a same fabrication process on a substrate of semiconductor material, and an amplifier circuit to which an output of the corresponding noise source is supplied; and a signal variation detecting circuit to which outputs from said plurality of unit circuits are supplied;

wherein said plurality of unit circuits and said signal variation detector circuits are configured to perform operations including:

generating a binary signal at each unit circuit by amplifying noise superposed on a differential of a threshold voltage of the first logic circuit and second logic circuit of each respective unit circuit;

generating, at said signal variation detecting circuit, an output signal in response to a variation in any of the binary signals outputted from the respective unit circuits;

combining a plurality of the binary signals outputted from the signal variation detecting circuit to generate a random number; and supplying the generated random number to the application specific function of the semiconductor circuit device.

10. The semiconductor integrated circuit device as claimed in claim 9, wherein the first and second logic circuits, of each respective unit circuit, are formed with logic gate circuits each having a first and a second input, respectively, the logic gate circuit in the first logic circuit being configured to have its output connected to its first input, the logic gate circuit in the second logic circuit being configured to have its first input connected to an output of the logic gate circuit in the first logic circuit, wherein the amplifier circuit includes a plurality of logic gate circuits each having first and second inputs, said plurality of logic gate circuits being connected in series so that an output of a logic gate circuit is connected to the first input of a next logic gate circuit in the series, wherein, when an operation control signal is supplied to the second input of the logic gate circuits, respectively, said plurality of unit circuits are caused to generate a random number via the signal variation detecting circuit.

11. The semiconductor integrated circuit device as claimed in claim 10, further comprising an order control circuit configured to generate the operation control signal, wherein the plurality of unit circuits are successively selected in response to said operation control signal generated by the order control circuit, and wherein the signal variation detecting circuit is arranged at an output one of the plurality of unit circuits.

12. The semiconductor integrated circuit device as claimed in claim 11, wherein the signal variation detecting circuit includes an exclusive logic circuit configured to generate the random number by serially receiving output signals from the respective unit circuits successively selected corresponding to the operation control supplied by the order control circuit.

13. The semiconductor integrated circuit device as claimed in claim 12, wherein the logic gate circuits of each unit circuit are logic gate circuits of CMOS configuration and when the unit circuits are set to a non-active state by the operation control signal, a P-channel MOSFET of the logic gate circuit of each respective second logic circuit is set to an OFF state.

14. The semiconductor integrated circuit device as claimed in claim 13, wherein each MOSFET in a respective unit circuit has a gate length and a gate width formed greater than that of MOSFETs in logic circuits of the signal variation detecting circuit or the order control circuit.

15. The semiconductor integrated circuit device as claimed in claim 12, wherein the plurality of unit circuits are arranged in a matrix, wherein each circuit arranged in the matrix is provided with an input unit configured with a logic gate circuit having a first input and a second input, wherein, in response to a row and a column selection signal supplied to the first input and the second input, said input unit is configured to output the operation control signal which causes the logic gate circuit in the first logic circuit and the second logic circuit to be in a selected state, wherein said matrix is configured so that the second input of the logic gate circuit of the amplifier in one of the unit of the circuits is supplied with an output signal of another of the unit circuits which is arranged at a stage preceding in a row direction of the matrix such that when the operation control signal is in a non-selected state, the amplifier circuit in said one of the unit circuits amplifies the output signal from said another of the unit circuits of the preceding stage.

16. The semiconductor integrated circuit device as claimed in claim 12, wherein the order control circuit includes a test mode configured to determine similar unit circuits a plurality of times continuously, wherein the semiconductor integrated circuit device is further provided with a circuit for counting a number of unit circuits forming different outputs among the output signals outputted a plurality of times from the same unit circuit, and when the number of unit circuits forming the different output signals is one or more, the random number generating circuit is judged to have a high quality.

17. An electronic device formed with a random number generating member configured to supply a random number to an application specific function of the electronic device, said random number generating member comprising:

a plurality of unit circuits each having a noise source including a first logic circuit and a second logic circuit, each logic circuit having a same configuration and each being formed through a same fabrication process on a substrate of semiconductor material, and an amplifier circuit to which an output of the corresponding noise source is supplied; and a signal variation detecting circuit to which outputs from said plurality of unit circuits are supplied;

wherein said random number generating member is configured to perform operations including:

generating a binary signal at each unit circuit by amplifying noise superposed on a differential of a threshold voltage of the first and the second logic circuits of the respective unit circuit;

generating, at said signal variation detecting circuit, an output signal in response to variation in any of the binary signals outputted from the respective unit circuits;

combining a plurality of the binary signals outputted from the signal variation detecting circuit to generate a random number; and supplying the generated random number to the application specified function of the electronic device.

18. A random number generating method in an electronic device, the method comprising:

providing a random number generation member including a plurality of unit circuits each having a corresponding noise source including a first logic circuit and a second logic circuit, each logic circuit having a same configuration and being formed through a same fabrication process on a substrate of semiconductor material, and an amplifier circuit to which an output of the corresponding noise source is supplied, the random number generation member also including a signal variation detector circuit to which outputs from said plurality of unit circuits are supplied;

mounting the random number generation member to the electronic device; and causing said random number generation member to perform operations including:

generating a binary signal at each unit circuit by amplifying noise superposed on a differential of threshold voltages of the first and the second logic circuits of each respective unit circuit;

generating, at said signal variation detecting circuit, an output signal in response to a variation in any of the binary signals outputted from the respective unit circuits;

combining a plurality of the binary signals outputted from the signal variation detecting circuit to generate a random number; and supplying the generated random number to an application specific function of the electronic device.

\* \* \* \* \*